April 16, 1963 H. R. LINDERFELT 3,085,297
DOOR FOR PRESSURIZED CABIN
Filed Aug. 28, 1956 9 Sheets-Sheet 4
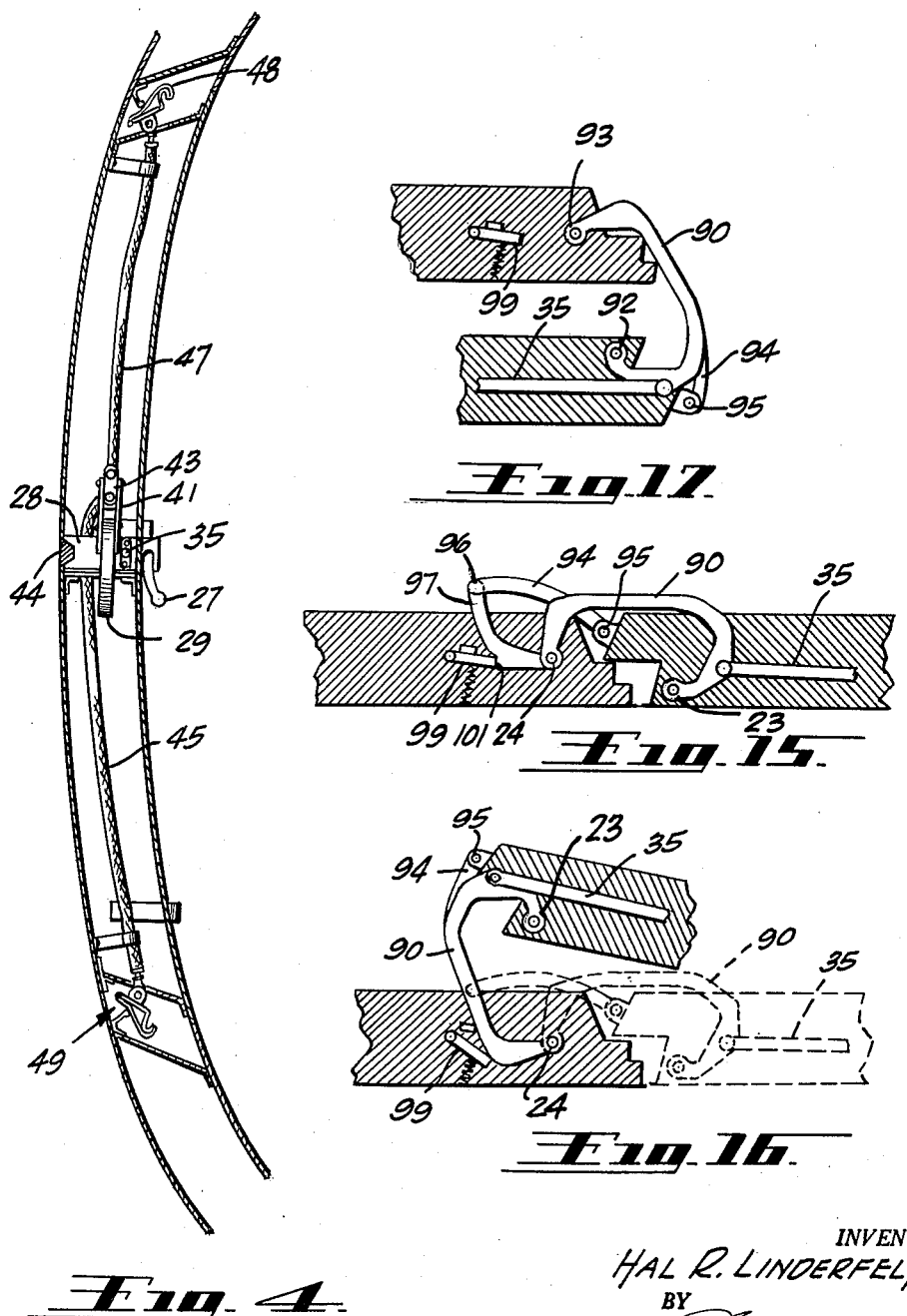
INVENTOR.
HAL R. LINDERFELT
BY
-ATTORNEY-

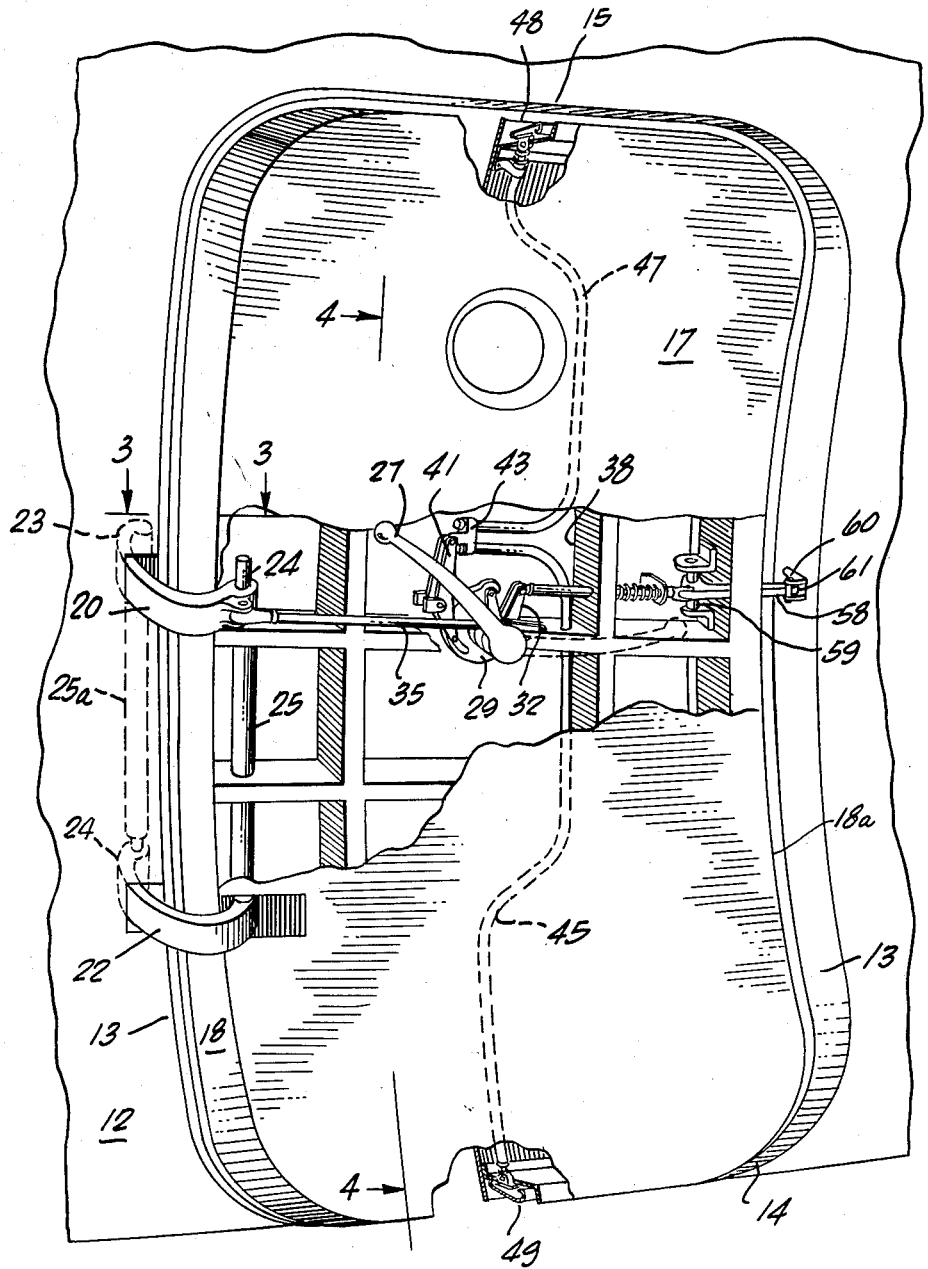

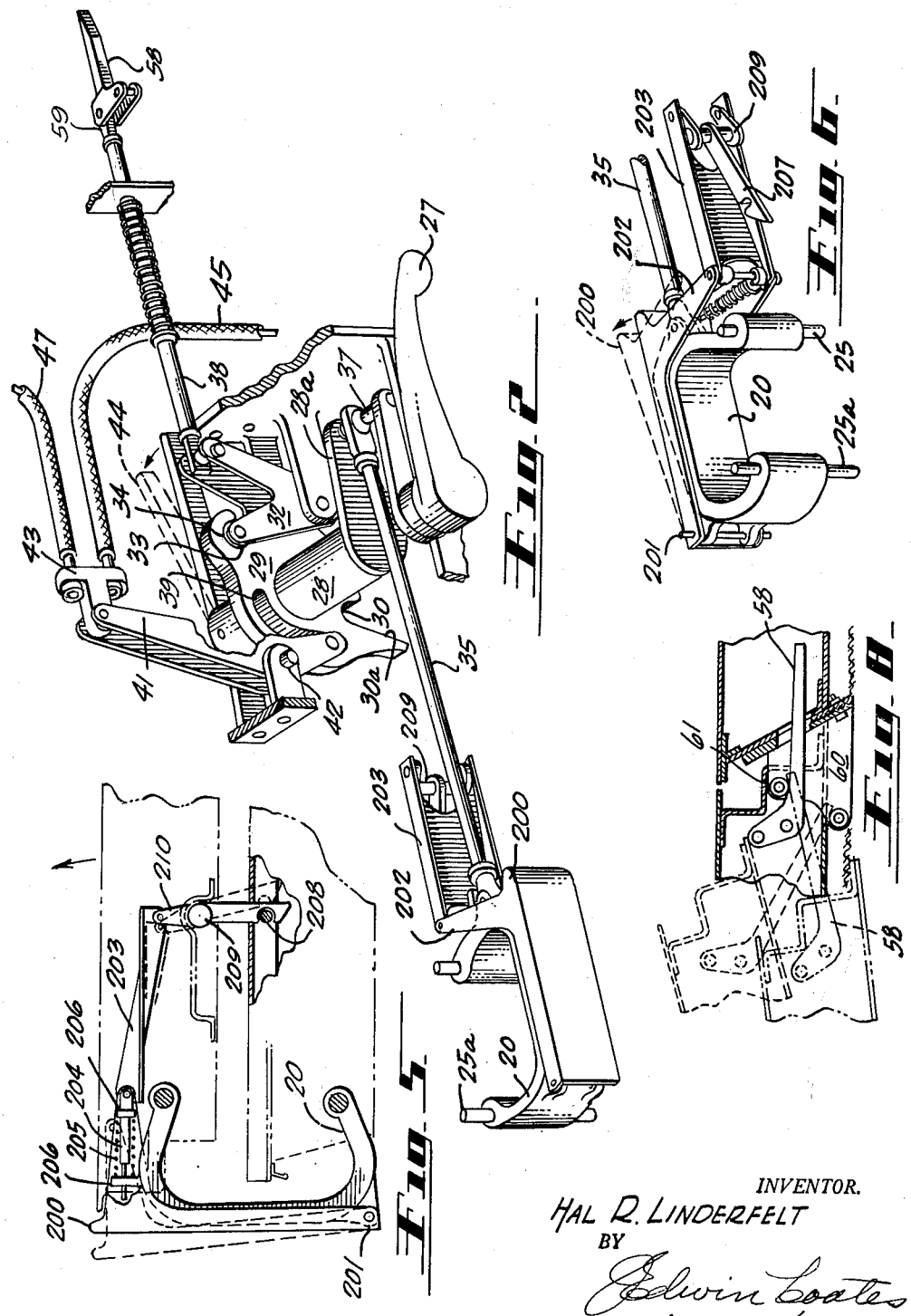

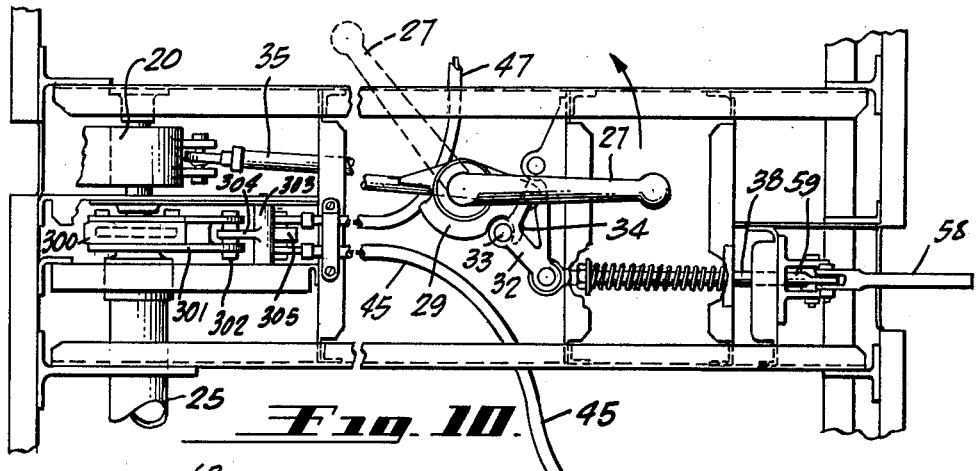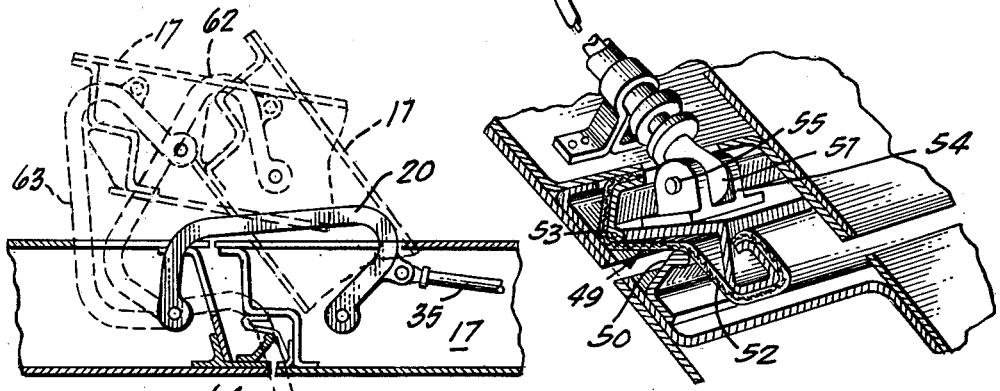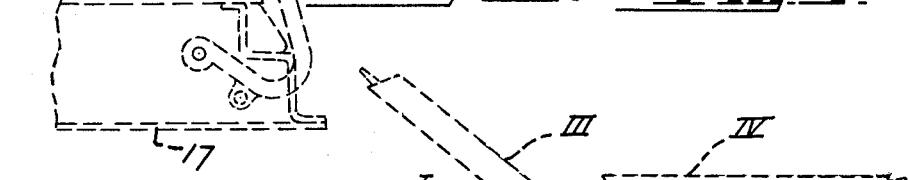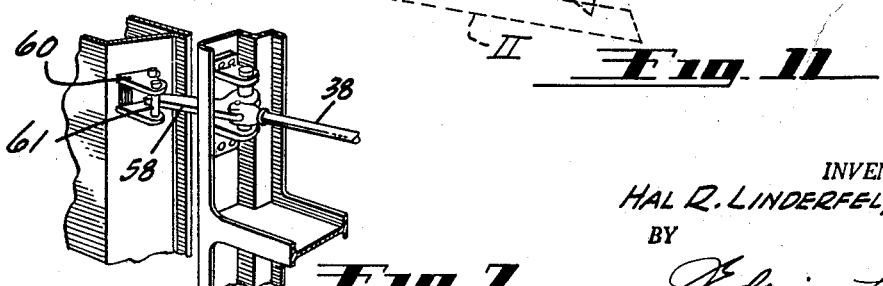

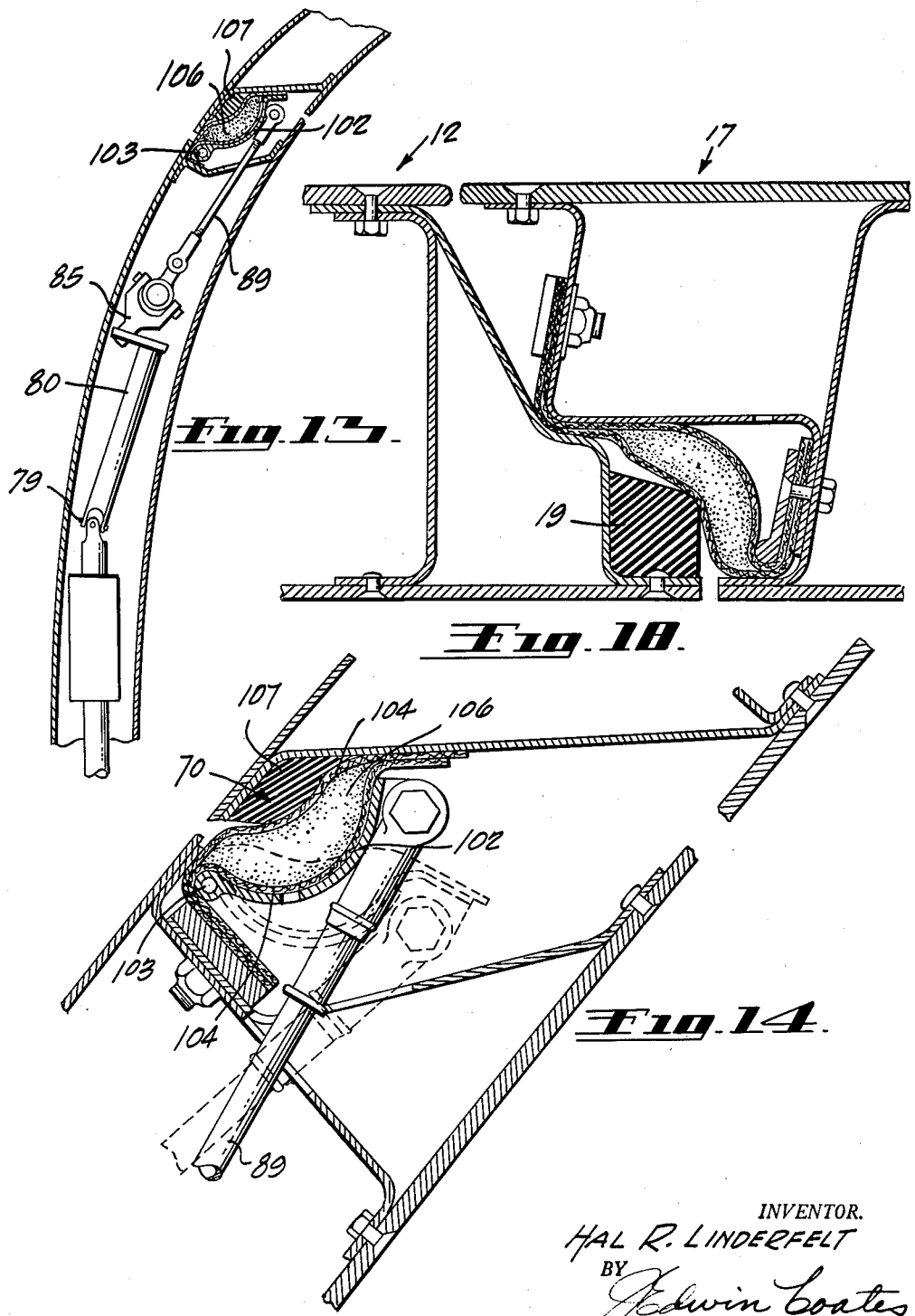

INVENTOR.
HAL R. LINDERFELT

April 16, 1963 H. R. LINDERFELT 3,085,297
DOOR FOR PRESSURIZED CABIN
Filed Aug. 28, 1956 9 Sheets-Sheet 8
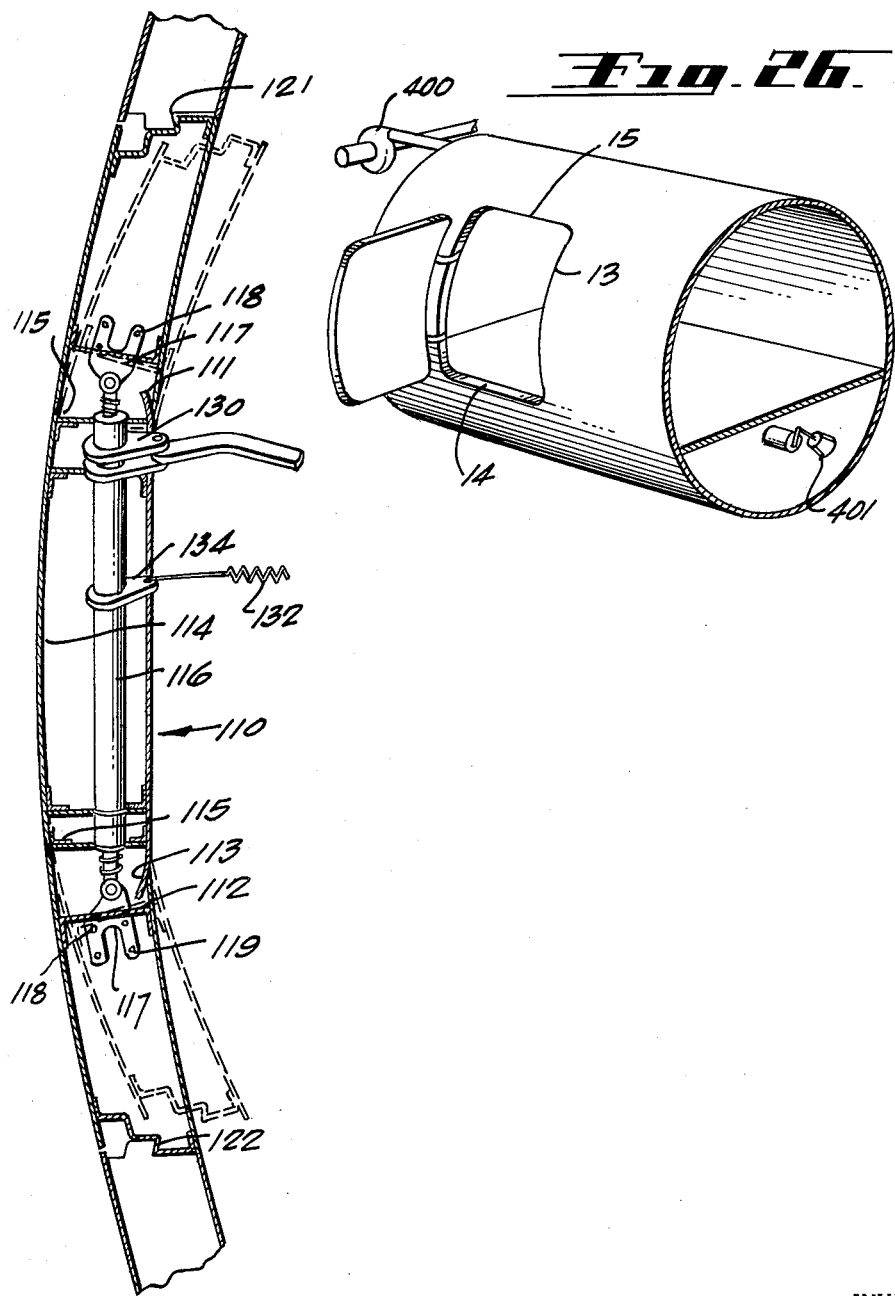
INVENTOR.
HAL R. LINDERFELT
BY
Edwin Coate
- ATTORNEY -

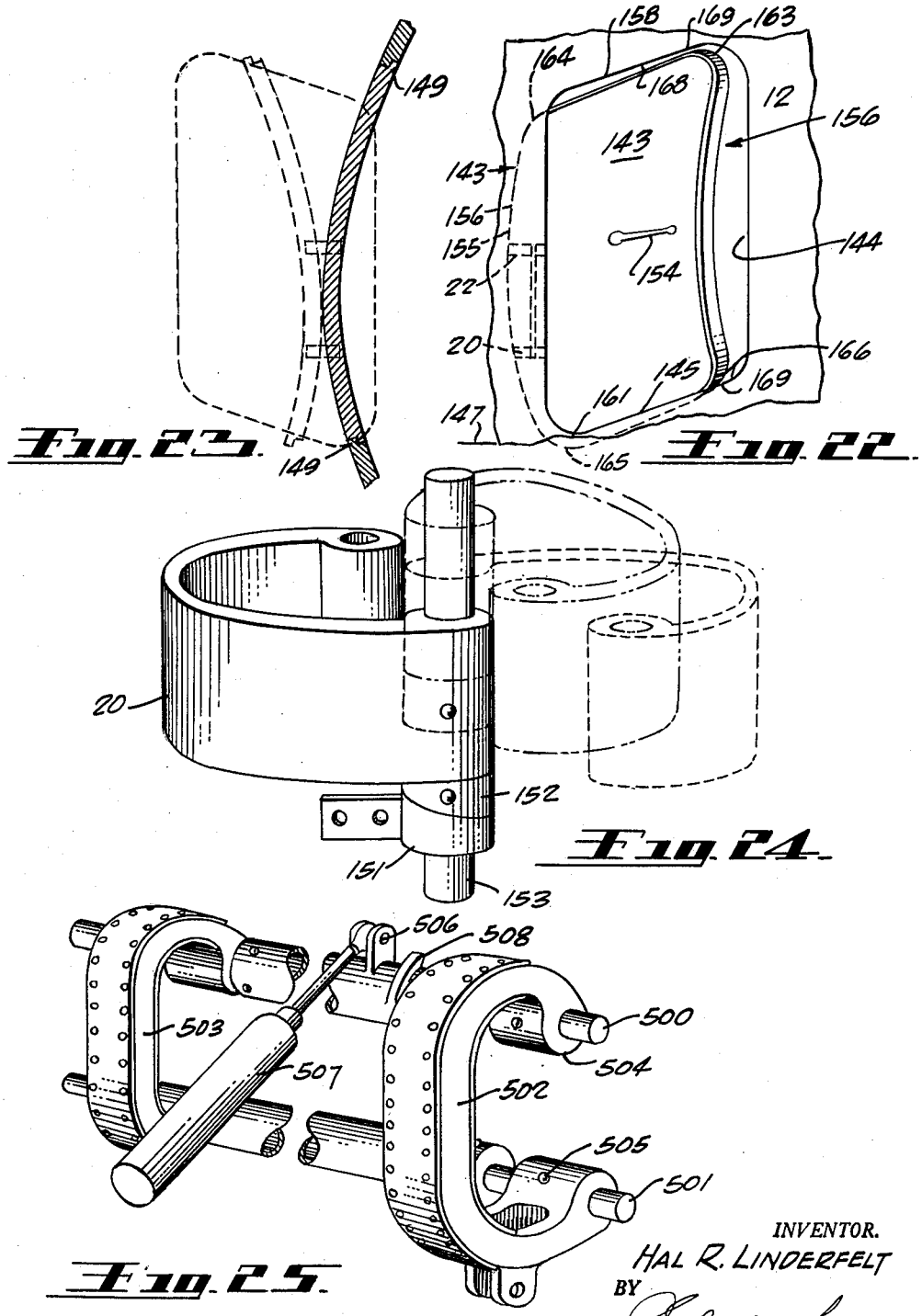

United States Patent Office 3,085,297
Patented Apr. 16, 1963

3,085,297
DOOR FOR PRESSURIZED CABIN
Hal R. Linderfelt, Los Angeles, Calif., assignor to Douglas Aircraft Company, Inc., Santa Monica, Calif.
Filed Aug. 28, 1956, Ser. No. 606,601
25 Claims. (Cl. 20—16)

This invention deals with transport aircraft and is particularly concerned with the safety of the occupants thereof when the aircraft is in flight.

The air in the cabin of such aircraft is mechanically pressurized whenever the craft is at substantial altitudes, this pressure usually being elevated considerably above that of the circumambient atmosphere. Naturally the cabin's enclosure, or fuselage, must incorporate in its walls certain main, or passenger, entrance and exit doors and these doors are hence subjected to air-pressure loads on their inner faces which, depending on the face area of the door, sometimes totals ten tons or more. Obviously, if such a door is constructed to open immediately outwardly and an uninformed passenger or other occupant inadvertently releases the latches, etc., the door and passenger will be swept outwardly by the air-pressure differential. Unfortunately, this situation is more than a theoretical possibility and, to date, no "fool-proof" latching, locking, or other safety adjuncts have been conceived which infallibly prevent the occurrence of this catastrophe.

Although doors that would immediately swing inwardly might ameliorate the situation, it is not the best economy to provide such doors in aircraft cabins, where space is at a premium.

A by no means negligible disadvantage of aircraft cabin doors that are of the type which move or open entirely inwardly, that is, provide ingress and egress solely by swinging interiorly of the cabin throughout their entire path of opening movement arises in connection with the panic crowding against such doors by the occupants upon the occurrence of fire, escape of noxious gases, or catastrophes of similar panic-creating magnitude. It is obvious that such a door could not be opened by any means available to the occupants, nor even if provided with the door operating mechanism of any of the known types. The consequences to all the occupants of the craft can easily be imagined.

Subject invention provides a main, or passenger, entrance and exit door for an internally air-pressurized aircraft cabin, which, by any of the means available to an occupant of the cabin, cannot be "opened" to any extent or in any direction so long as the aircraft is in flight with an air pressure on its inner face that exceeds the external air pressure thereon by the normal amount.

This invention thus substantially completely precludes the occurrence of such fatal "man overboard" accidents as those aforementioned. At the same time, when the pressures on the opposite faces of the door equalize, which occurs primarily when the craft is resting upon the ground, ready for the passengers to disembark or embark, the door, after a slight inward displacement of one edge thereof, can thereafter readily be opened outwardly and disposed in a position against the fuselage that substantially completely clears the portal in the fuselage.

Briefly stated, such door arrangement generically comprises, essentially, an outward opening in the fuselage of an aircraft cabin, the opening including, of course, a pair of laterally spaced jambs, a sill and a lintel, all being tapered convergently outwardly to confer a more or less wedge shaped, or trapezoidal, horizontal sectional aspect upon the opening. Constructed to "plug into" such opening, more or less in the manner of a wedge, is a door panel and appurtenances. The closed overall, or effective, height of the door is of course rendered greater on its inner face, by appurtenances later described, than the overall height of the outer face of the door and the actual overall structural width of the door, in all positions thereof, is permanently greater than the width of the outer face of the door. However, in the preferred species the appurtenances that render the overall height greater than that of the outer face of the door here take the form of retractable air-tight seals arranged along the upper and lower edges of the door to cooperate with complementary members similarly arranged along the sill and lintel, so that upon operating the door, they may be retracted sufficiently to decrease the effective height of the door assembly to a dimension that enables the door to be displaced or "sidled," outwardly through the door opening.

Novel door suspending, or door-hanging, guiding, and motion-controlling means are provided to interconnect the one edge-region of the door with the adjacent jamb-region and these means are so constructed and arranged that, when the door unlatching, moving, and seal retracting mechanism is operated, by an operator either on the inside or the outside of the door an edge of the door is at first, moved or displaced laterally and towards the interior of the cabin. Thereafter, the door opens, on the whole, outwardly, and both actions can be performed with the inner face of the door tightly contacted by a panicked crowd of occupants, even to a number of the order of ten or eleven occupants. For, the exertion of a force of ordinary magnitude, say of the order of 100 lbs., on the door's "handle" is converted and multiplied by the high mechanical advantage of the novel operating and door supporting and guiding means of this invention, to a degree approximating the order of 600 pounds, at least. Since the side thrust of eleven average weight adults crowded against the door can hardly amount to much more than 600 pounds, this high mechanical advantage enables a force of ordinary magnitude exerted upon the door's handle to easily overcome this side thrust, to inwardly unplug the door and to thereafter sidle it through the door opening and into the clear. Thus, no such catastrophe as those due to panicked occupants crowding the door can occur in the present invention. More specifically, the first step of the door-opening operation displaces a first edge of the door bodily laterally, either forwardly or rearwardly, of the fuselage and slightly inwardly, transversely of the cabin. Further application by the operator of force to the door operating mechanism causes the novel supporting, guiding and motion controlling means aforesaid to constrain the door to displace very little laterally instead effecting a pivoting or rotation of the door-unit about a vertical axis thereof and further bodily outwardly through the door-opening, "sidling" through the opening with the door-edge lying opposite to the first edge now "leading". Continued operation of the door-opening mechanism terminates with the door substantially entirely clear of the door-opening and abutted facewise against the adjacent exterior surface of the fuselage.

In this fully opened position, it is contemplated that automatic "latching-open" means become effective, along with hydraulic snubber means acting to damp door vibrations caused by ground-winds striking the opened door. A novel box-frame rigidifying internal door structure is incorporated in the door and prevents local distortions, etc, thereof by severe ground-winds striking the open door.

Several species of retractable seals and seal operating means are contemplated and will be detailed hereinafter, the ones at the top and bottom of the door being retractable to decrease the overall height of the door to facilitate its outward passage through the door opening, the ones at the jambs being fixed and stationary.

In a certain other embodiment of the invention, no seal is retractable; instead, the door is so constructed as to "fold" or bend in its lengthwise or height direction and suitable means are provided, operated by the door-opening mechanism itself, for contracting the door along these "fold-lines," thus to also decrease the effective height of the door, for the aforesaid purpose.

In still another species, the seals are also non-retractable, and the door is not folded, yet can be "sidled" out of the door-opening nonetheless. Essentially, this action is enabled by constructing the door-opening and the door panel as matching rhomboids, that is, with each having a substantially parallelogramatic, or "askew rectangle" elevational form. The door supporting and guiding means, and motion-controlling means are then so constructed and arranged that when the door-operating mechanism is actuated by an occupant the "low" edge of the askew rectangle is first displaced inwardly slightly, and laterally whereafter briefly stated, the aforesaid guiding and motion-controlling means constrains the "high" edge to move laterally and outwardly through the "low edge" region of the opening so that the door can be cleared through the opening.

More specifically, in this embodiment of the invention in which no constriction of the height of the door is effected, nor are the sealing means retracted, both the door and the door-opening have the elevational shape of a rhomboid, although of course both are curved or warped about their transverse center lines to conform to the convex curvature of the fuselage. By virtue of this basal configuration, each of the four true-geometric corners of the rhomboidal doors, constituted by the intersections of the prolongation of each two adjacent sides of the door, is at a different vertical location from those of the other three corners. Further, each of these four corners of the door lies at a different lateral distance from the vertical line connecting the hinges from the distances at which the other three corners lie. The door's corners are so disposed that no two corners pass through the door-opening simultaneously. The slanting top edge of the closure extends higher above one upright edge than the slanting bottom edge of the closure extends below said upright edge. Both the hinges lie below the horizontal center line of the closure and are interconnected. A cylindric, inclined-face cam is fixed coaxially to these hinge-connecting means and a complementary cylindric cam is fixed to the fuselage structure co-axially sub-adjacent to the first cam with its "low" side sub-adjacent to the "high" side of the first-said cam, so that the unplugging of the door effects downward camming thereof, the outward sidling of the door effecting upward camming thereof.

Hence, counter clockwise rotation of the door's handle, in the "door-opening" direction, effects one-quarter of a revolution of the hinges toward the interior of the cabin with a high mechanical advantage, unplugging the forward edge, say, of the door and displacing it forwardly, and also inwardly by a matter of a few inches. The aft edge of this rhomboidal door is thereby constrained to translate laterally forwardly also. The lower rear corner of the door is, by virtue of the rhomboidal shapes and the novel hinges and linkage, displaced farther forwardly than is the upper rear corner.

The unplugging motions concurrently cam the door lifting and lowering cams downwardly, carrying the door bodily downwardly at this juncture, all corners etc. of the door moving parallel to themselves so that all points of the door move through an "overall" equal distance for the entire door. Such action positions the upper rear corner of the door ready to emerge first, sidling through the door-opening without requiring vertical contraction of the door or seals. Then the outward urge upon the door swings same bodily, or bodily revolves it, with the upper rear corner thereof clearing through the door-opening, despite the fact that the hinge cam-means are now beginning to raise the entire door. When, upon continuance of this door-swinging movement, the lower rear corner of the door arrives at the slanting door sill, the conjoint actions of the upward-camming motion and the initially greater forward lateral motion of this rear corner, carry it over the "high" rear portion of the downwardly and forwardly sloping sill. Next, the upper, forward corner of the door approaches the inclined lintel. This corner might well "interfere" with the lintel on its way were it not for the fact that the curvature of the outwardly convex, inwardly concave upper portion of the warped-surface door constrains this corner to swing through an augmented arc and causes this corner to pass through the outwardly convex door opening at or near the vertical center line of the door-opening. It hence clears this upwardly and rearwardly sloping portion of the lintel.

At this juncture, the entire door has now passed through the door opening save the lower forward corner of the door. This corner is still in the interior of the cabin and lies, now, below the inclined sill. Continuance of the outward urge on the door continues the rotary camming action on the hinge-group and door to a cam-point which effects final raising of the door. Thus, this lower forward corner of the door clears out of the door-opening without interference with the sill-corner adjacent thereto.

When the door is being closed, the aforestated conditions and sequences are merely reversed and achieve airtight plugging of the door into the door-opening.

Other specific embodiments of the foregoing general concepts, together with details of their construction and operation, as well as other appurtenances and auxiliaries, will either be made manifest hereinafter or become apparent as this disclosure proceeds.

The aforementioned, and other, embodiments are shown in the accompanying drawings and described hereinafter in detail, but solely by way of example and to render the general concepts more concrete.

In these drawings,

FIGURE 1 is a fragmentary elevational and perspective view, sighting from the interior of the cabin, showing the now-preferred safety door inwardly "unplugged" in the first phase of its opening movements, the lintel and sill seals being retracted, the door-open latching means being omitted for purposes of clarity;

FIGURE 2 is mainly a perspective view of the triple-nature hinge (and door) operating mechanism which also operates the door latch and the retractable seals, the door being closed;

FIGURE 3 is mainly a fragmentary horizontal section of the closure arrangement, taken on line 3—3 of FIGURE 1 to show the various kinematic positions of the upper hinge and the door;

FIGURE 4 is a vertical section on line 4—4 of FIGURE 1, taken to show this door closed and with the seals protracted;

FIGURE 5 is a fragmentary view, partly in plan and partly in section, of the door fully open and latched in the open position;

FIGURE 6 is a perspective view of the latching means of FIGURE 5 the door being in the closed position;

FIGURE 7 is a fragmentary perspective view of the bayonet-type "door-closed" latching unit;

FIGURE 8 is a fragmentary horizontal section of the latter latching unit showing the various positions which the "bayonet" member occupies during the various kinematic positions occupied by the door;

FIGURE 9 is a fragmentary perspective view of one of the retractable seals, used both at the lintel and at the sill;

FIGURE 10 is a partial elevational view of the door of FIGURE 1 but incorporating a somewhat different door-hinges and seals-operating mechanism;

FIGURE 11 is a diagrammatic horizontal sectional view of the door-arrangement, taken to illustrate the various kinematic positions occupied by all but one of the species of the door;

FIGURE 13 is a fragmentary vertical section of the upper portion of the door of FIGURE 12;

FIGURE 14 is an enlarged detail of the upper portion of FIGURE 13;

FIGURE 15 is a horizontal fragmentary section, partly in plan, of the door arrangement, taken to show, in the aforementioned second species of the door, the novel 4-bar linkage door-supporting and guiding and motion-controlling means, the door here being closed;

FIGURE 16 is a similar view showing the door partially "opened," or unplugged toward the interior of the cabin;

FIGURE 17 is a similar view with the door in fully outwardly opened position;

FIGURE 18 is a substantially horizontal section of the door-arrangement taken to show the fixed jamb-seals that are employed in all species of the door;

FIGURE 20 is a fragmentary vertical section of this door, showing, in broken lines, the door partially unplugged inwardly by means of novel door-bending and opening mechanism;

FIGURE 22 is a fragmentary interior elevational view of this latter door in its partially open, inwardly unplugged position;

FIGURE 23 is a view, mainly in fragmentary section, of this fourth door, showing it in closed position in solid lines, in outwardly "sidled" position in broken lines, and in fully open position in broken lines;

FIGURE 24 is a perspective view of the hinge and door raising and lowering camming mechanism;

FIGURE 25 is a fragmentary perspective view of a rigidifying-framework employable in the door, the view also showing the door-damping mechanism employed to prevent the open door from being slammed against its jamb; and FIGURE 26 is a fragmentary perspective view of an air-pressurized aircraft cabin incorporating one of the present doors.

Figure 12:
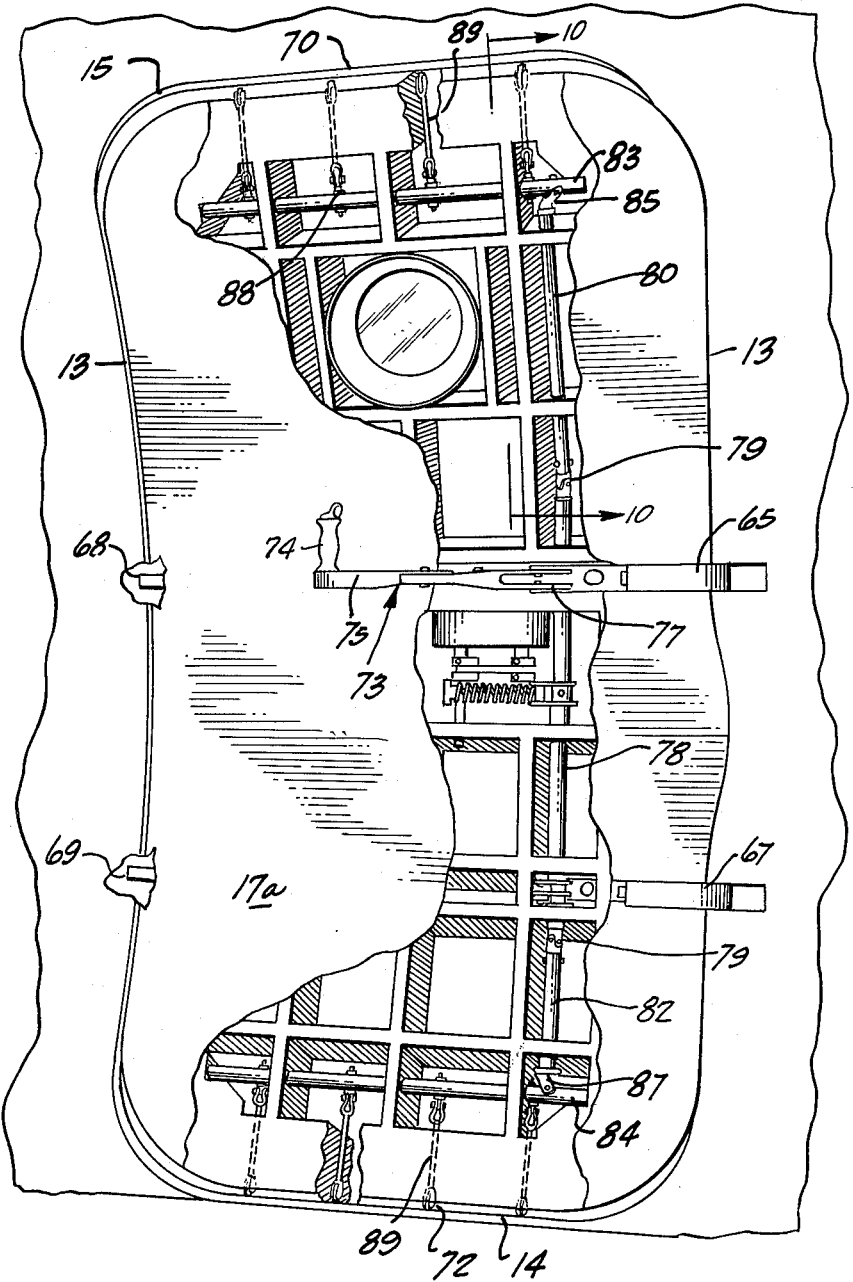
FIGURE 12 is a fragmentary elevational and perspective view, similar to that of FIGURE 1, of another form of the present door.

The species of main door which is at present contemplated for the most extensive use is set forth in essential particulars in FIGS. 1–10 inclusive. Substantially, it comprises a safety closure device, or devices, for an outward opening in an air-pressurized fuselage the worward region of which fuselage is shown at 12. The door-opening comprises a pair of laterally spaced jambs 13, a sill 14 and a lintel 15, and the periphery of this opening is substantially wedge-shaped, the walls thereof being outwardly convergent.

Into such opening is fitted a rigid, rectangular panel 17 which has a periphery that is also outwardly convergent so as to "plug," or substantially wedge, into the aforesaid opening. The forward edge of this panel is shown at 18 in the position the door occupies upon first being displaced from congruity with the contour of the fuselage in opening the door. All along each jamb, and according with the horizontal section thereof shown in FIG. 18, the space between the door's longer edges and the jambs is occupied by a substantially conventional fixed type jamb seal 19, against which seals complementary conventional seals on the jambs of the air-pressurized, plug-type door seat, when closed, in substantially the conventional manner.

The closure is mounted to the fuselage, or interconnected therewith permanently but, of course, movably, at only two loci, occupied by the novel door-supporting and guiding means 20 and 22. Member 20 may be designated as the upper hinge-unit, 22 being the lower such. 20 is pivotally anchored to the cabin, inside the fuselage double-skin, as at point 23, 22 being so anchored at point 24. A tie-rod, 25A, interconnects points 23 and 24.

The opposite or door-contained ends of the novel yoke-shaped door supporting guiding and motion-controlling means 20 and 22 are spacedly journaled on a vertical torque tube, or rotatable shaft, 25, the ends of which are suitably rotatably mounted inside the door, in its jamb region by means not shown, but well-known.

The door is also provided with novel protractable and retractable seals along its sill and lintel portions and with a novel rotatable bayonet, latch, lock or the like at its "aft" edge, the details of which are hereinafter described, the point here being that (1) the door is motivated for opening and closing, (2) the seals are retracted and protracted and (3) the bayonet latch is operated merely by manipulating a single operating lever or handle 27. The latter is mounted upon a rotatable shaft 28 that extends in the thicknesswise direction of the door.

At the outer-skin end of this shaft is fixed as detailed in FIG. 2, a more or less circular cam 29 which transforms the rotative motion of the shaft into the proper reciprocative motion of the latch-operating means, the hinge-operating means, and the retractable-seals operating means. To these, and other ends, the periphery of the cam includes a notch 30. The purpose of this notch is, when properly rotationally positioned, to allow the latch-actuating crank, later detailed, to rotate clockwise (viewed facing the inside of the door), releasing the latch so that the door may be swung outwardly through the opening. Notch 30 with its prolonged edge, 30A, also positively inhibits rotation of handle 27 until the door is again closed and automatically latched.

To these ends, notch 30 is engageable and disengageable by a pivoted bell-crank 32, or directly, by a roller cross pin 33 mounted in one arm of the crank.

The cam 29, at a point spaced peripherally considerably away from notch 30, also bears a detent 34, which, in due course of rotation of the handle and shaft, engages pin 33 for affording a positive lock preventing operation of the bayonet latch after the door is closed and if one should attempt to rotate handle 27 counterclockwise. This configuration also is useful, when the cabin is de-pressurized and with the ship grounded, in preventing the door's being violently blown open inward, with the latch "off," as by ground-squalls or even by flight-gusts when the cabin pressure has not reached optimum.

A single means for activating the door supporting and guiding means, which include the hinges 20 and 22, etc., is provided and here takes the form of a hinge actuating push-pull rod 35 suitably pivotally attached at its one end to the shaft 28, as by pivot-and-pin 37, the latter being located off center from shaft 28, as by means of a crank 28A in the latter. Rod 35 is suitably pivotally attached at its other end to an ear, or the like, as shown, on hinge 20, the latter being torquingly united to hinge 22. The hinge-actuating push-rod is, when the door is unplugged inwardly, held in an "over-center" position by means of a compression spring, not shown, but properly interposed in the mechanism.

The swinging, or rotary, or "bayonet" type latch, 58, later detailed, is directly actuated by a spring-loaded push-pull rod 38 which is pivotally connected at its inner end to the other arm of the bell-crank 32 as shown, the outer end of rod 38 being pivotally attached to the pivotally mounted ear 59 at the inner end of latch 58. Latch 58 is pivotally mounted in the door's structure, near its aft edge, by means of the bracket and torque tube arrangement shown in FIG. 7.

Cam 29 also affords means for simultaneously retracting or protracting the aforementioned sill-seal and lintel-seal. These means include a cam-track 39 in cam 29. A link, or transmission member 41, pivoted to extraneous structure at 42, engages at one end in camway 39 and at its opposite end is pivotally attached to the "leader" or cross-head, 43, of a pair of push-pull or Bowden-type seal-actuating cables, 45 and 47. Incidentally, the handle 27, lying on the inner face of the door, is substantially duplicated by a similarly functioning handle 44 on the outer face of the door.

Cable 45 transmits handle motion to a lower protractable and retractable air-tight seal unit 49 whereas cable 47 does likewise for an upper seal unit 48.

As typified by the lower seal unit 49 shown in FIG. 9, each seal unit essentially includes a transversely extending striker 50, fixed to the sill or lintel, as the case may be, against which the diaphragm seals 52 are airtightly brought to bear when the door is closed. Each diaphragm is stretched across the suitable edges of a transversely extending extrusion or the like, each extrusion being pivotally mounted, as at 53, to the sill or lintel edge of the door, as shown. A connecting ear 54 for engaging the Bowden cable or push-pull means, is mounted to each extrusion and each ear is pivotally connected to the adjacent terminus 57 of the proper Bowden cable.

The bayonet-type latch group, as seen in FIG. 7, includes the aforesaid male member, 58, pivotally mounted to the aft edge-portion of the door and a "keeper" or socket group 60, fixedly mounted to the transversely adjacent portion of the aft jamb. The group 60 consists, as shown, of a box-like structure, the plates of which are spaced, at their forward ends and outer rear sides, by a vertically mounted roller, 61, as shown, so that the latch, in working around its pivot, first inwardly in the subsequent phases of door opening, meets with little frictional resistance from the keeper group.

When the door is swung against the exterior side of the fuselage, co-acting means on the door and on the fuselage's side automatically interengage to hold the open door in its "door-open" position. As seen in FIGS. 5 and 6, the means on the door comprise a channel shaped member 200 which embraces the upper hinge 20 being pivoted thereto at 201 and which dually constitutes both a latch unlocking means and the proximal link of a toggle linkage group of which the distal link is another channel-section 203. Member 200 also includes an arm 202 protruding rectangularly thereto and to which link 203 is pivotally attached. One of these pivots is spring-loaded so that the unit normally tends to retract into the door-structure. This spring loading group includes a headed pin 204, a compression spring 205 around the pin 204, and spaced abutments 206 for the spring.

Mounted at the distal end of link 203 and lying in a horizontal attitude between the flanges of the channel, is a notched member, or detent, 207. It is pivotally carried by means of a pair of spaced arms 210 defining a yoke which is pivoted at its inner ends 209 to the outer end of link 203. By means of this configuration, when the door is fully opened and abutted against the exterior side of the fuselage, detent 207 is automatically engaged with complementary detent means 208 properly located just within the exterior of the fuselage. To unlatch the opened-door, it is only necessary to grasp hand-grip 200 and pull the linkage 201—203 into the dotted line position shown in FIG. 5.

The kinematics of the door itself is diagrammatically depicted in FIG. 11 which is a horizontal section of the door and the adjacent portions of the fuselage wall, or cabin enclosure. By virtue of the supporting, guiding and motion controlling means aforedescribed, the door, when there is no, or little, air-pressure differential existing on the opposite major faces thereof is, broadly, upon first application of manual force to the lever 27, initially unplugged inwardly from its outwardly-plugged, latched and air-tightly closed position, shown in solid lines, and assumes the position shown in broken lines and labeled "II." That is to say, the door is constrained to move mainly inwardly but is concurrently bodily displaced forwardly, with its forward edge leading, the aft edge also being displaced forwardly, but directed with reference to the forward edge, in the outward direction of the opening; that is, the door is revolved about its vertical axis, directing the aft edge thereof definitely in the outward direction. Thus, both edges of the door are displaced forwardly from their original locations, and the forward edge therefore of course lies inwardly of the fuselage wall. The invention contemplates, however, that the aft edge may either be displaced inwardly of the fuselage, or remain within the confines of the door opening, depending upon the total length of the hinges and the locations of their points of pivotal attachment to the door and to the fuselage.

Thereafter, outward urging of the "unplugged," or initially inwardly "opened" door, results in its sidling outwardly of the opening, one of its outward sidling positions being designated "III." In this outward sidling motion, the aft edge leads the forward edge, now displacing rearwardly. The door revolves outwardly about the pivot points 23 and 24 connected as a line of centers.

Continued application of the outward urge upon the door now swings it bodily and eventuates in the door's assuming the position designated "IV" in which the door lies adjacent the forward exterior face of the fuselage with its outer convex face juxtaposed to the outer convex face of the fuselage.

Operationally detailed rotation of handle 27 in the clockwise direction through an arc of about 135°, rotates the two C-hinges inwardly simultaneously. This effects movement of the forward edge of the door inwardly and forwardly, clearing the adjacent jamb. The hinge actuating rod 35 is now held over center by the aforesaid spring.

When the handle 27 reaches full clockwise travel of 135°, the bayonet latching cam 29, affixed to the handle shaft, is thereby so positioned as to permit bell-crank 32 to rotate clockwise, thus to enable the door to sidle outwardly through the opening. Notch 30 prevents handle 27 from being rotated again or until the door is closed and the bayonet 58 is socketed in the jamb. Hook 34 now positively locks 58 against rotation about its vertical axis and past the rollers in the socket now that the door is closed and latched, such latter being effected by rotating 27 now in the counter clockwise direction. Such action obviates the door opening, or unplugging, inwardly, before the normal cabin air-pressure is achieved, as by gusts or other loads on the exterior of the door.

Concurrently with unplugging, the upper and lower seals are retracted through the push-pull controls actuated by lever 41.

In FIG. 10 there is shown a door arrangement which is similar to that of FIG. 1, differing therefrom only in that it has a somewhat different handle-operated arrangement for concurrently operating the retractable lintel and sill seals. Generically the two doors are identical. Rather than operating same from a separate mechanism associated by a lever, etc., with the circular cam on the shaft of the door's handle, the push-pull rod 35 and the hinge-operating torque tube 25 are constrained to, themselves, operate the seals' push-pull cables 45 and 47.

To this end, the tube 25 is provided, near its upper end, with a hollow collar, or the like, 300, spacedly bearing a pair of parallel arms 301 rigidly attached thereto. At the one end thereof, arms 301 bear a pivot pin 302. A rotary header 303 for push-pull members 45 and 47 is mounted inwardly of pin 302, to which it is connected by an arm 304. From the opposite side of header 303 protrudes an arm 305 to which the members 45 and 47 are fixedly attached by the fasteners shown.

When handle 27 is operated, in the manner described in connection with FIG. 1, torque tube 25 is rotated to the left, viewing FIG. 10, pulling arms 301 out of the plane of the paper, rotating pin 303 to the right and pulling members 45 and 47 leftwardly, thereby effecting retraction of the lintel and sill seals. Reverse operation of the handle 27 effectuates protraction of the seals.

The second species of door-arrangement illustrated in FIGS. 12–17, inclusive, is constructed generally similarly to the foregoing species and its rule of action and mode of operation, or the kinematics of its paths of movement, are substantially the same as those aforesaid.

However, the door supporting and guiding mechanism, the mechanism for protracting and retracting the lintel seal and sill seal, the "door-closed" latching means as well as the manual means for concurrently activating all the aforesaid means differ widely from the corresponding means of the first described species.

As shown in FIG. 12, into an outward opening, more or less outwardly convergent, or wedge shaped in all sections at its periphery, and which opening includes jambs 13, a sill 14 and a lintel 15, there is plugged from inwardly to outwardly a rigid panel, or obturator, 17A having a correspondingly outwardly convergent, or wedge-shaped, periphery. It is supported and guided in its familiar kinematic paths, including inwardly unplugging, outward "sidling," and then full swinging by an upper "4-bar type" linkage hinge-unit 65, detailed in FIGS. 15, 16 and 17, and a similar lower 4-bar linkage hinge unit 67, not shown, but which is identical therewith. The construction and operation of these linkages are later detailed.

The door is held latched in its closed position by a substantially conventional upper rigid-latch and tapered socket arrangement 68 for receiving and releasing it in the usual manner, and a lower such unit, 69. The door is air-tightly sealed at the jamb region by a fixed-seal arrangement such as that shown in FIG. 18. The latter is common to all the present doors. It is sealed at its lintel edge by means of a retractable and protractable air-tight seal unit 70 and is sealed at its sill region by a similar unit 72.

Substantially intermediate the top and bottom of the door is an operating unit 73 including a hand grip and lock 74 and a horizontal lever 75. The inner end of the lever is mounted to a bifurcated arm 77 rigidly carried by a medially located, upright torque tube 78. Tube 78 is, by means of universal joints 79, as shown, operatively connected at each of its extremities to super-adjacent and sub-adjacent upright torque tubes 80 and 82.

A horizontally disposed torque tube 83 is oscillatably connected to the upper end of tube 80 by a suitable bifurcated link and pivots group 85 and the lower end of tube 82 is similarly connected by similar group 87 to a horizontally extending oscillatable torque tube 84.

Each of the tubes 83 and 84 bears a plurality of clevises 88 distributed therealong and a pivoted-ended link 89 connects each clevis to the respective upper and lower pivotally mounted retractable and protractable seals, 70 and 72 as detailed in FIG. 14.

As shown in FIG. 14, each of these seals 70 and 72 comprises an outwardly concave metallic carrier strip 102, extending along the upper transverse edge of the door and pivoted at its lower edge, as at 103, to the door structure. Actuators 88 have their upper ends pivoted to the upper edge of the carrier 102, as shown, and moves the seal unit from the solid line protracted position to the dotted line retracted position when the door operating handle is moved horizontally inwardly in opening the door and vice versa when the door is being closed and latched. The seal itself consists of a substantially conventional arrangement comprised essentially of a pair of spaced diaphragms 104. In the space between them is disposed a strip of resilient-elastic or elastomeric material 106. The seal, when protracted with the door closed, bears airtightly against a coextensive "striker" strip 107, mounted to the lintel or sill edge of the door-opening, as the case may be.

The units constituting the novel 4-bar linkage, door-supporting guiding and motion-controlling means, of this second species, and indicated by 65 and 67 each include, as shown in FIGS. 15, 16, and 17, a main yoke-shaped member 90 constituting the main element of the hinge and which may well generally correspond to the upper and lower C-hinges, or yoke hinges, of FIG. 1. The one end of each member 90 is pivotally anchored at 24 to the fuselage wall adjacent the edge of the outward opening therein, the opposite end portion being pivotally anchored, as at 23, to the corresponding edge-portion of the door itself. This element constitutes what might well be designated the "first" bar of a novel 4-bar linkage system, the "second" bar 94 of which linkage is inwardly convex, is pivotally attached at 95 to the extreme edge of the door in its jamb region, as shown, and is pivotally connected at its opposite end, as at 96, to the "third" bar, 97 of the four-bar linkage. Bar 97 is oppositely curvilinear to bar 94 and is conjointly pivoted at its one end to the pivot 24 for the first link, its opposite end being pivoted at 98 to the adjacent end of bar 94. The fourth link of the 4-bar linkage is, of course, constituted by the right transverse, or horizontal cross-sectional dimension or a structural element of the door itself. All the links of each of the "hinge" groups lie in coplanarity, as is obvious.

When this door is first unplugged inwardly, subject linkage acts so as to constrain the forward edge of the door to displace laterally forwardly and also inwardly somewhat as shown in FIG. 1. In fact, both edges of the door, and the door itself, are thereby displaced forwardly and out of the door-jamb confines, the door concurrently being rotated about its vertical axis so that it now, in this first kinematic stage, is oblique in the horizontal plane and lies angled to its original position.

As outward force is applied to the unlocked and unplugged door, link 90 is revolved inwardly of the fuselage around pivot 24 and it and links 94 and 97, constrain the door to take up an outwardly directed attitude with the first-mentioned edge now trailing the opposite edge and with the latter edge leading through the door-opening in the fuselage, as indicated in FIG. 16. In constraining the door to effect this movement, link 94, located generally in a plane below link 90, comes into substantial congruity with 90 while underlying it. First, however, these movements disengage from a notch 101 in link 97, a spring-loaded detent 99 provided to normally maintain the links in the position shown in FIG. 15 (and also acting as a stop to prevent undesired outward displacement and assumption of an inoperative attitude by the links 94 and 97).

At this juncture, the overcenter arrangement on the hinge operating push rod 35, connected suitably to the door operating unit 73, etc., locks the links 90, or hinges per se, together with their now congruent links 97, in the relative positions shown in FIG. 16. Hence, with 24 now acting as the general pivot, the partly emerged, canted door can thereafter be manually swung or revolved bodily outwardly about 23, 24, etc., and into a position juxtaposed to the exterior of the fuselage, the convex outer side of the door abutting that of the fuselage, and substantially entirely clear of the door's opening in the fuselage, as shown in FIGURE 17.

Outside latch means and means for operating same, as shown in FIGS. 5 and 6, are also provided but not here shown, as well as trussing or rigidifying means in the interior framing of the door and hinges, together with a hydraulic dashpot, or the like, all to the end of enabling the opened door to resist successfully forces tending to distort it, such as ground winds, careless leaning on the door, and sudden slamming of the door. The general conception of means for achieving these latter objectives is shown in FIG. 25 and are hereinafter described in conjunction therewith.

Figure 19:
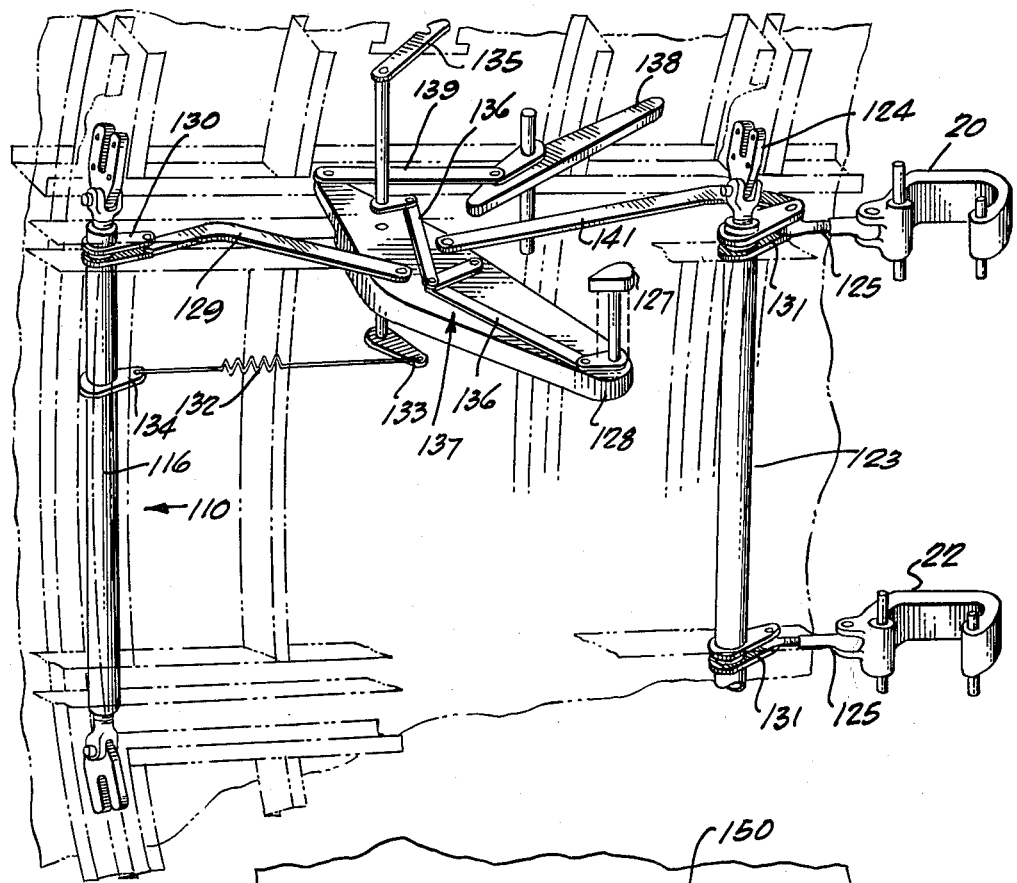
FIGURE 19 is a fragmentary perspective view of a third species of the door and its operating mechanism.

A third one of the presently-contemplated species of closure arrangements for air-pressurized aircraft cabins is illustrated in FIGS. 19 and 20. When a standard-size outward opening for passenger use is contemplated, yet the lower portion of this opening is to accommodate appurtenances such as anchorages, etc. for passenger exit and entrance steps, or emergency escape-chuteways, the full height of the outward opening must be cleared of the door, or other obturator-means, as soon as the door begins to open.

To this and other ends the door of this third species is so constructed and provided with such means as to begin to diminish in effective height, with relation to the outward opening, concurrently with the commencement of that movement of the door operating handle which effects "unplugging" of the door towards the interior of the now depressurized cabin. This construction and these means are such, also, that reverse, or door-closing, and plugging movement of this handle restores the door to its full height for filling and sealing this outward opening along the entire peripheries of the door and the door-opening.

Essentially, the parts and arrangements involved in this species of door comprise a dually-folding or inwardly bending door panel 110 mounted in the usual outward opening in the fuselage. The panel's inner skin is provided with a pair of transversely extending slits, 111, 112 or this skin may merely be provided with lines of weakness, these slits being vertically spaced apart, and the arrangement including overlaps or lips 113 that provide a smooth interior surface for the door. The outer skin 114 of the door is continuous and intact but adapted to be bent at fulcrum points 115. Thus, by suitable means, when the lever 128 is properly operated, the door eventually assumes the position shown in dotted lines in FIG. 20.

The aforesaid suitable means, in one typical embodiment thereof, include a first double-end screw jack 116, extending upright along one edge inside the door, and adapted to be torqued, as later described, by handle 128. Tube 116 terminates at its opposite ends in screw operated door bending yokes 117. The yokes, as shown, are at one end pivoted to the torque tube and, at their opposite ends, rigidly attached, as at 118 and 119, to the structure of the bendable portion of the door.

Fixed air-sealing means carried partly by the upper edge of the door and partly by the lintel define a sealing unit 121 which is substantially duplicated in the sill region by unit 122. Fixed jamb-sealing units, as in FIG. 18, are also employed.

The door also carries, near its forward edge, another upright screw jack arrangement 123 which not only supplements the door-bending function of tube 116, but dually functions to operate the novel hinges 20 and 22, which can be constructed, and operate, in substantially the same manner as those of FIG. 1, etc. Hinges like 20 and 22 are operated from ears 131 on tube 123 by means of connecting rods 125. Tube 123 terminates in screw operated bending yokes 124, pivotally attached thereto and rigidly attached to the transverse web in the bendable portion of the door.

The single operating lever, 128, provided is mounted to normally lie transversely substantially flush with the door and lever 128 effectuates both the bending of the door and the operation of the hinges, etc. 20 and 22. Adjacent the inner end of lever 128 one end of a force-transmitting lever 129 for torquing tube 116 is pivotally connected, is other end being pivotally connected to ears 130 and 116. In order to effect return of handle 128 to normal position and to effectuate return of the door from the broken line position to the solid-line position, a spring 132 with anchor arms 133 and 134, is operationally interposed between handle 128 and tube 116, as shown. This spring holds handle 128 in either the open or closed position.

In order to positively maintain the door latched open after it has been juxtaposed to the outer side of the fuselage, an automatically operative open door-hold-open latch arrangement, 135 and 138 is provided. Locking and unlocking linkage 136 therefor lies atop the lever 128, being connected at its outer end to the safety lock group 137 associated with hand grip 127. On the outside of the door is an unlatching arrangement 138 and 139, etc., associated with the hold-open latch 135. It is to be understood that conventional pressure-door "closed" latches, not shown, are provided on the aft edge of the door and are adapted to seat and unseat in tapered face sockets in the adjacent jamb.

The fourth species of the invention is illustrated in FIGS. 21–24, inclusive. In this species, by a slight sacrifice as to the simple conventional rectangular elevational-shape of the door, here instead giving it, and the door-opening, a slightly rhomboidal or "askew" elevational shape at its upper and lower edges, resulting in a substantially parallelogrammatic, or rhomboidal, planform, certain advantages ensue. Among these advantages may be mentioned that by virtue of a novel relationship of door opening shape to the outward opening-shape of the door itself, as well as because of novel hinge-actuating means in the fuselage, it is quite unnecessary to either constrict the door vertically or to employ retractable air-seals at any edge of the door or door-opening, all seals having a "half" fixed to the periphery of the door, the other "half" being fixed to the periphery of the door opening, said "other" half being air-tightly overlapped by the first-mentioned half. Other advantages of this novel species will become self-evident hereinafter.

Essentially, this fourth species of the door comprises a rigid door panel 143 for plugging outwardly into an outward opening 144 from the inside of the cabin, both the opening and the closure having vertical and parallel front and rear edges joined by parallel downwardly slanting top and bottom edges. FIG. 22 sights toward the partially opened door from outside the fuselage. That is to say, the door in elevational form is substantially a parallelogram, or rhomboid, with its corners rounded and its opposite sides parallel, the periphery of the door being substantially plug-shaped or outwardly convergent to plug into the complementary shaped periphery of the door-opening. Also, a complete structural "overlap" exists between the door and its jambs, sill, lintel and the adjacent rounded corners. The bottom edge 145 of the opening 144 slants forwardly and downwardly with reference to the floor 147 of the cabin, which lies substantially level with the aft portion of said bottom edge, the forward portion of said bottom edge lying below the floor level. A slight indentation 148 is provided at the abutting edge of the floor to allow for the very slight inward-displacement of the forward edge of the door upon being unplugged. This gap can without difficulty be substantially bridged and covered by an upper platform portion of the passenger-steps, not shown, when positioned in the opening, or it may be covered with a narrow triangular segment of flooring hinged inwardly to the main cabin floor.

As aforestated, the periphery of the inner edge-portion of the door is provided with fixed-type airsealing means which may well be of the type shown in FIG. 18 and adapted to sealingly cooperate overlappingly with similar seals around the periphery of the inner-edge peripheral region of opening 144, as in the conventional manner. It is to be noted that neither of these seal means is retractable or protractable, thus obviating all seal-operating mechanism, as well as affording other advantages.

In order to enable such seal means to be employed, among other reasons, the door is so mounted, guided and controlled in its unplugging and outward-displacement actions that, briefly stated, without retraction of seals or shrinking of actual height, the "low," forward, side or edge of the askew parallelogram can be inwardly and forwardly displaced out of the opening to unplug the door and, by camming the hinges up or down, as the case may be, its forward edge, carrying the protruding sealing means at its periphery, is bodily displaced in a vertical line in the door opening. This opening's lower edge lies "lower" in the cross-sectional direction of the door opening, than the aft edge of the opening. This movement of the door automatically cams it downwardly to this desired position by means of a hinge-and-door lifting (or lowering, as the case may be) cam and cam follower arrangement, 151 and 152, etc. The cylindric fixed cam 151 is mounted to the fuselage structure, as by means of the bracket shown, whereas the cylindric cam follower 152 is carried by and rotates with the hinge rod or tie 153 which connects the upper hinge 20 with the lower hinge 22. Normally, the "high" point of cam 152 contacts the "low" point of coaxial cam 151. Hinges 20 and 22 are substantially identical with those shown in FIG. 1 and, aside from the aforesaid camming action, together with the fact that they both lie below (or both above, if desired) the horizontal center-line of the door, are substantially the same as in FIG. 1 and support and guide the door 143 through substantially the same kinematic path or motion positions as do the hinges of FIG. 1. Latching means like those of FIGS. 5 and 6 are provided at the opposite edge of the door and door-opening and operate, if desired, without the employment of a central handle and linkage system like that of FIG. 1, as do all the latching means of this species, as well.

Figure 21:
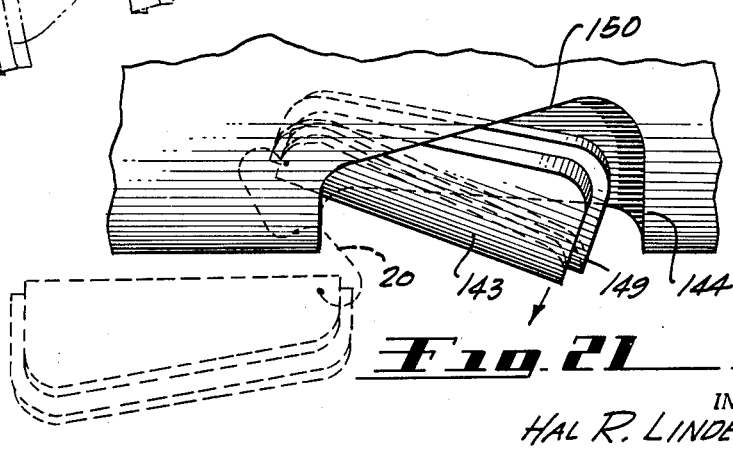
FIGURE 21 is a fragmentary top plan view of a fourth species of door, shown in its partially open position in full lines and in fully open position in broken lines.

The various operational positions of this door are shown in FIGS. 21–23, inclusive, FIG. 22 showing the first, or unplugging, position of the door with the forward edge 155 thereof leading and displaced laterally or forwardly of the opening and also lying slightly transversely inwardly of the fuselage. The opposite edge of the door is displaced forwardly and is directed outwardly.

An outward urge on the door now revolves it around its vertical axis with the aft edge now leading out of the door-opening, the forward edge trailing and remaining temporarily within the confines of the fuselage. However, the final outward urge on the door produces a full-swinging motion, bodily, of the door around the now outwardly extending hinges, the door eventually assuming the final position shown in broken lines in FIG. 23, the beginning position of its attitude for commencing this bodily outward swinging being illustrated in the same figure in broken lines.

Thus, by constructing the door and door-opening as matching outwardly-convex rhomboids, and constructing and arranging the door supporting, guiding and motion controlling means and the door up-and-down camming means in a manner correlated to these shapes, etc., the door may be operated in a novel manner so as to obviate sealing means, vertical constriction of the height of the door, or the like complexities.

More specifically, this novel operation depends upon the facts that (1) the enclosure, is outwardly convex, (2) the door is congruently curved; (3) the hinges are off-center with the horizontal centerline of the closure, and (4) the hinges, rigidly united vertically, are cammed first downwardly to unplug the door and then upwardly to enable sidling the rhomboidal door outwardly of the opening. It is also to be noted that each of the four rounded corners, 163–166, of the closure lies at a different vertical location from that of any other corner; that the true-geometric centers of these corners, formed by the intersection of the prolongations of each two adjacent sides of the closure, lie at different lateral distances from the upright centerline of the closure, that no two corners of the closure are able to pass through the opening simultaneously, and that the slanting top edge of the closure extending higher above the one upright edge thereof than the slanting bottom edge of the closure extends below said upright edge.

With these facts in view, when the door operating mechanism or handle 154 on the inner face of the door is actuated, the entire "low," upright edge 155 of the rhomboidal door is first displaced slightly inwardly and concurrently laterally, the aforementioned guiding and motion controlling means, 20, 22, etc., constraining the "high" edge 156 of the door to displace laterally and point, or address itself, outwardly of the door-opening at the "low" region 157 of opening 144. Since the top edge 158 of the door extends farther above the hinged edge 155 of the door than the bottom edge of the door 161 extends below this hinged side 155 and since each of the four corners 163, 164, 165 and 166 of the door lies at a different vertical location from that of each of the remaining three corners, and since each of the four corners of the door lies at a different lateral distance from the vertical line connecting the hinges from the distance at which the other three corners lie, and in view of the fact that the door's corners are so disposed that no two corners may pass through any portion of the door-opening simultaneously, the unplugging effecting counterclockwise movement of the door-operating handle 154 to a position thereof about the same as that shown in FIG. 1 effects revolutional movement or displacement of the hinges 20 and 22 toward the interior of the cabin, the mechanical advantage being of the order of ten to one. This hinge displacement effects lateral and inward displacement of the forward edge 155 of the door. Concurrently, the aft edge 156 of the door is constrained to translate laterally forwardly also while being generally directed, pointed or addressed in the outward direction. However, the lower rear corner 166 of the door is, by virtue of the present novel shapes and mechanical movements, shifted or displaced farther forwardly than is its upper rear corner 163.

The rotary movements of the door concurrently actuate the door lifting-and-lowering camming mechanism, 151 and 152, in such a manner that the door is first cammed bodily downwardly, all edges and portions of the door moving parallel to themselves so that all points of the door move through an equal distance. This occurrence positions the upper rear corner 163 of the door where it is ready to be the first portion of the door to actually protrude from the door opening. This it later does in a sort of sidling action, obviating seal-retraction and door-height constriction.

Thereafter, more outward urge upon the door bodily revolves it until the upper rear corner 163 thereof clears through the door-opening, despite the fact that the door lifting and lowering cam-group has now reached its door-lifting phase. Continuance of this outward urge and door-swinging brings the lower rear corner 166 adjacent to the "high" end 169 of the sill, but the conjoint actions of the upward-camming motion and the initially greater forward displacement of this rear corner, carry it over the "high" rear portion of the downwardly and forwardly sloping sill.

As the door-swinging movement continues, the upper forward corner 164 of the door approaches the similarly inclined lintel 168. This "low" end of the lintel would constitute an obstacle or interference to the passage of the door if it were not for the fact that the outwardly convex curvature of the upper portion of the door constrains this corner 164 to swing through a larger arc than does the corresponding, or aligned, lower corner 165 and these facts, coupled with the camming and hinging action, constrains corner 164 to swing through the door opening substantially in the region of the vertical center-line of the door-opening so as to entirely miss this "low" portion of the lintel.

All corners of the door have now passed through the door-opening except the lower forward corner 165 of the door. This corner is, at this juncture, still inside the fuselage wall and has now reached a position below the adjacent portion of the inclined sill. However, further outward urge on the door continues the rotary camming action to that "high" cam point which raises the hinges and door. Thereafter, the lower forward corner 165 of the door also swings out of the door opening without interference with the sill-corner adjacent thereto.

It is obvious that, when closing the door from either the outside or the inside, it is merely necessary to reverse the direction of urge on the door, whereupon the aforestated conditions, positions and kinematics will proceed in reverse order to those set forth above.

Automatic open door-hold-open latching means, not shown but of any conventional type, or consisting of the general type of those previously described herein, are provided on the exterior of the fuselage in a region where they are adapted to be abutted by the juxtaposed convex outer face of the now fully open door and automatically "take" on a latch pin therein, as before. These means can readily be unlatched preparatory to closing the door, whereafter the door-opening kinematics is reversed to position the door in its airtightly closed attitude.

In case the panel-framework of the door itself needs rigidifying, as against ground gusts, rough handling, door-slamming, and other unusual conditions, the invention contemplates so doing by means which transform the two vertical axis members, or torque tubes, of the door and the associated pair of C-hinges into a rigid quadrilateral, as seen in FIG. 25. In the optional construction illustrated therein, the vertical members 500 and 501 are rigidly tied to the C-hinges 502 and 503, as by means of pin-members 505. Thus, the rigid 4-member framework, and the door panel built therearound, rotate about the constricted cylindrical ends of the members 500 and 501, mounted pivotally in, respectively, the door-panel and the fuselage framework. When the door is opened wide against the outer side of the fuselage, gusts impacts, etc., cannot deform the door which is maintained dimensionally stable and fits snugly thereafter into the doorway.

This bracing-framework may be employed, if desired, in any of the aforedescribed doors, either with, or without, the door-checking device 507. The latter comprises a hydraulic dash-pot, or snubber, pivotally connected at one end to ears 506 on the door and suitably anchored, not shown, at the opposite end.

This snubber prevents slamming the door in the one direction whereas the lug 508 prevents excessive movement in the opposite direction.

FIG. 26 depicts the combination with the structure 12 of a pressurized aircraft cabin, formed with a doorway to the exterior, that is defined by a sill 14, a lintel 15 and two spaced jambs 13, of a door, which may be any of the aforedescribed doors. The cabin is pressurized in the usual manner by a supercharger 400 and controlledly vented by a valve 401.

It has now been made manifest that so long as there is sufficient unbalanced air pressure acting outwardly on the closed door, which condition usually obtains when the craft is in flight, it is highly unlikely that any means available to any of the occupants of the craft will be effective to even unplug the door, much less to outwardly open same, so that the door may justly be termed an "absolute-safety" door. That is, there is only a highly theoretical possibility of a repetition of the not infrequent occurrence of loss of a passenger by being "blown overboard."

Despite the fact that the unbalanced outward air pressure on the inner face of the door, which unbalance is, in one or other of the aforedescribed manners, employed by novel constructional and operational means to positively prevent either inward or outward opening of the door so long as there is a sufficient degree of unbalance, nonetheless when the craft is resting on the ground with equal, or substantially equal, air pressures on each of its two major faces, the opening thereof then is a rather simple and facile thing to accomplish. In fact, because of the powerful mechanical advantage of the novel hinge construction and of its operating mechanism associated with the "handle," etc., the door can be readily inwardly unplugged with as many as elevent adults crowded tightly against its inner face. In the event of a fire or other catastrophe on board rendering imperative rapid emergency disembarkation of panicked passengers "rushing" the doors, this fact is of no small consequence.

Other advantages and advances of the several doors described hereinabove are inherent therein and will become apparent to those conversant with this particular art.

Although for the sake of concreteness, certain of the components, parts and arrangements have been particularized with limited specificity as to their particular shapes, etc., nonetheless such specificness in nowise limits the nature or scope of the essence of the invention. The latter is to be taken as bounded only by the scope and range of equivalents of the sub-joined claims, which define the inventive advances in terms of the essential physical syntheses of essential constructional elements.

I claim:

1. A closure arrangement for an outward opening in an enclosure, comprising: an obturator having its peripheral surface shaped to fit outwardly into said opening from the inside of the enclosure and adapted to be held seated by a predetermined pressure-differential acting outwardly on its inner face; said obturator then having a maximum height substantially equal to the minimum height of said opening, said minimum height of said opening lying on the outer face of said opening; said obturator including retractable sealing means located at the lintel and sill edges of said door and normally airtightly abutting the lintel and sill when the door is closed so as to confer a height on the door greater than the height of the outside face of the door opening; means for bodily translationally retracting said sealing means from its normal sealing position a degree sufficient to reduce the effective height of said door to a value less than that of said opening; and obturator supporting and guiding means interconnecting the obturator and the adjacent portion of the enclosure, said supporting and guiding means being so constructed, organized and arranged with reference to said obturator and to said opening as to constrain the obturator initially to unseat inwardly at a first edge and to concurrently have the opposite edge of the obturator directed outwardly with the first edge and leading the movement of the obturator; the obturator being thereafter constrained by said means to be bodily edgewise displaced outwardly through said opening with said opposite edge leading the movement of the obturator, so as to finally bring the obturator to rest substantially entirely clear of said opening and outwardly of the enclosure.

2. A door arrangement for an outward opening in an air-pressurized fuselage, which door effectively resists inadvertent opening in either the inward or the outward direction so long as the air-pressure equals a predetermined value, comprising: a closure air-tightly held seated in said opening by said air pressure; said door, when seated, having an overall height at least equal to the minimum height of said opening; said minimum height of said opening lying on the outer face of said opening; said door including substantially-bodily translatable and retractable sealing means at its lintel edge and at its sill-confronting edge, said sealing means conferring on the closed door a height greater than the height of said opening; means for bodily inwardly translating said sealing means from their effective sealing positions by an amount adequate to reduce the overall height of the door-unit to a height less than said minimum height of said opening; and closure supporting and guiding means constructed and arranged with reference to said closure and to said opening effectively constraining movement of said closure into a first position inwardly and laterally said opening to unplug said opening; said means thereafter constraining said unplugged closure to sidle outwardly of said opening at an edge opposite the first-moving edge and thence to occupy a position substantially entirely clear of said opening.

3. In a pressurized aircraft fuselage having an outward opening therein: a safety closure for said opening; said closure, when closed, being held seated by the air-pressure in the fuselage and having sealing means disposed along the lintel and sill edges of the closure and normally abutting same to give the closure an effective operational height and width exceeding those of said opening and then being air-tightly seated upon a periphery of said opening; means for bodily translationally retracting both of said sealing means from its door-frame abutting positions so as to reduce the overall effective height of said door; closure supporting and guiding means arranged along the one of the jambs of said opening; said means movably interconnecting the closure and the fuselage; said means being constructed and arranged with respect to the closure and to the fuselage so as to effect displacement of the closure, upon manual operation of the closure, initially inwardly and laterally at a first edge of said opening, the opposite edge of the closure concurrently displacing outwardly of said opening and trailing the first edge; said supporting and guiding means then constraining the manually impelled closure to sidle bodily outwardly of said enclosure through said opening with said opposite edge leading, whereupon to enable manual disposition of said closure in juxtaposition with the fuselage with its outer face adjacent the outer face of the fuselage; whereby said closure is at all times, when said fuselage is predeterminedly pressurized, inhibited from inadvertent opening either inwardly or outwardly.

4. A closure for an outwardly convergent opening in a pressurized enclosure, comprising: a plug-type obturator having upper and lower marginal portions vertically foldable about respective axes therefor that run transversely of the door, said obturator being adapted to fit into said opening from the inside of the enclosure; air-sealing means disposed between the peripheral margin of said obturator and the peripheral margin of said opening, said means being adapted to be so mutually interengaged as to seal said pressurized enclosure; yoke-type hinge means disposed along the one longitudinal edge of said obturator, each of said yokes having the one end thereof pivoted to the enclosure's structure and having the opposite end pivoted to said obturator so as to enable initial inward unplugging of said obturator; and manually operable means for temporarily vertically folding the upper and lower marginal portions of said obturator and thereby decreasing the effective vertical dimension of said panel to a dimension less than the vertical dimension of said opening so as to enable said obturator to be secondarily moved outwardly through said opening and into adjacency with the exterior face of said enclosure.

5. A safety door arrangement for an outwardly convergent, outward opening in an air pressurized enclosure, comprising: a closure panel for said opening, said closure panel having a thicknesswise shape, peripherally thereof, adapting same to fit congruently into the complementary shaped periphery of said opening; mutually complementary air sealing means respectively fixed coextensively to the lintel and sill-confronting edges of the closure panel and to the lintel and sill edges of the opening so as to coact sealingly when the closure panel is closed; manual force receiving and transmitting means disposed substantially transversely of said closure panel and having one end pivotal with respect to the closure panel, the opposite end of said manual means being free for movement away from and toward the closure panel; movable panel supporting and guiding means interconnecting the closure panel with the adjacent portion of the enclosure, the last said means being constructed and arranged to be rendered operative by movement of said manual means away from the closure panel so as to initially effect inward unplugging of the closure panel followed by outward sidling thereof through said opening, terminated by bodily outward swinging thereof so as to clear said closure panel substantially out of said opening; and rotative motion-transmitting means operationally interposed beween the pivotal end of said manual means and each of said movable sealing means and connected operatively to both of said bodily unitarily translatable sealing means for retracting same upon inward movement of said manual means away from said closure panel, whereby to decrease the effective overall height of the door-and-seals unit sufficiently to enable same to pass through said opening in the sequential movement-positions aforesaid.

6. A safety door arrangement for an outwardly convergent, outward opening in an air pressurized enclosure, comprising: a closure panel for said opening, said closure panel having a thicknesswise shape, peripherally thereof, adapting same to fit congruently into the complementary shaped periphery of said opening; mutually complementary air sealing means fixed coextensively to the jamb regions of the closure panel and of the opening so as to coact sealingly when the closure panel is closed; retractable mutually complementary air sealing means respectively bodily unitarily translatably carried coextensively by the lintel region and the sill region of the closure-panel and fixed coextensively to the lintel and sill regions of the opening and adapted to coact sealingly when the door is closed; manual force receiving and transmitting means disposed substantially transversely of said closure panel and having one end pivotal with respect to the closure panel, the opposite end of said manual means being free for movement away from and toward the closure panel; movable panel supporting and guiding means interconnecting the closure panel with the adjacent portion of the enclosure, the last said means being constructed and arranged to be rendered operative by movement of said manual means away from the closure panel so as to initially effect inward unplugging of the closure panel followed by outward sidling thereof through said opening, terminated by bodily outward swinging thereof so as to clear said closure panel substantially out of said opening; and rotative motion-transmitting means operationally interposed between the pivotal end of said manual means and each of said movable sealing means and connected operatively to both of said bodily unitarily translatable sealing means for bodily translating same toward the adjacent fixed edges of the closure panel upon inward movement of said manual means away from said closure panel; said manual means being also operatively connected to said closure panel supporting and guiding means so as to initiate the displacement of said closure panel substantially concurrently with the retraction of said air-sealing means; whereby to decrease the effective overall height of said closure panel and to effect displacements of said closure panel in the manner aforesaid.

7. A closure arrangement for an outward opening in an enclosure, the periphery of the opening being outwardly substantially wedge shaped, comprising: an obturator having an overall effective height approximating that of said opening and an overall width exceeding that of said opening, said obturator having a periphery shaped with an outwardly converging substantially wedge shape complementary to that of said opening so as to enable said obturator to be plugged into said opening; bodily unitarily translatable and retractable air sealing means arranged operatively along the sill region and the lintel region of said obturator; means for bodily unitarily translating and retracting said seals sufficiently to diminish the effective overall height of the door; an obuturator supporting and guiding means interconnecting the obturator and the enclosure; said supporting and guiding means being constructed and arranged with reference to the construction of the obturator and to that of the inwardly adjacent portion of the enclosure as to constrain the obturator's path of movement, upon inward unplugging thereof, to be bodily laterally, and inwardly, displaced at the one edge of the obturator; said inter-connecting means being adapted to thereupon constrain the opposite edge of the obturator to be displaced outwardly, bodily through said opening, said opposite edge leading the first edge, whereafter said inter-connecting and constraining means constrain the obturator to bodily swing outwardly into juxtaposition with the exterior side of said enclosure, the retractive position of said seals enabling the oversized obturator to sidle bodily outwardly through the opening in the enclosure.

8. The combination with an obturator for an opening in a pressurized enclosure which opening is generally smaller than the general face area of the obturator, said obturator having hinges constructed and arranged with respect to each other, and attached to a first edge of the obturator and to the adjacent jamb so as to constrain the first edge of the obturator to initially move bodily laterally and inwardly out of the opening, the obturator then being constrained to move outwardly through said opening with the opposite, second edge leading; of: means manually operable from a face-region of said obturator for effecting revolution of the outer ends of said hinges, carrying said obturator, so as to effectuate the aforesaid movement of said obturator; fixed air seals on the jamb-regions of the opening and on the jamb-regions of the obturator, the latter means sealingly overlapping the former; and bodily unitarily translatable air-sealing means retractably disposed along the lintel-edge and along the sill-edge of said obturator in overlapping relation with the enclosure, said sealing means being operatively connected to the manually operable means for enabling bodily retraction of said sealing means to a position lying within the confines of the minimum vertical extent of the door-opening by the actuation of the manually operable means.

9. A closure arrangement of the type described in an enclosure of the type described, and including an obturator for closing, from the inside of the enclosure an outward opening in an enclosure; said obturator having supporting and guiding means disposed along one edge thereof and interconnecting said obturator and said enclosure, each of said means including a pair of vertically spaced yoke-like hinge members having the one arm pivotally anchored to the enclosure adjacent said opening, the two pairs of such spaced pivots being rotatively interconnected in the enclosure, the opposite arm of each yoke-like member being pivotally anchored in the obturator and the two pairs of such spaced pivotal anchorages being interconnected in the obturator, both yoke-like hinges being clear of obstructions that would hinder bodily swinging of same about their first-said anchorages; and means for so swinging said hinges about said anchorages while connected to the obturator as to effect inward unplugging of said obturator, terminated by outward opening thereof against the exterior side of the enclosure, the last-said means comprising a shaft extending in the thicknesswise direction of the obturator and having a portion offset from the axis of the shaft; a shaft-rotating handle terminating the one end of the shaft and extending in the same direction as said handle; motion-transmitting means connectively extending between said offset portion and that arm of a yoke-hinge that lies in the enclosure boundaries; and pivotal connections between the ends of said transmitting means and the members it extends between; whereby upon predetermined rotation of said handle in a predetermined direction, the obturator-end portion of each hinge is swung inwardly and forwardly, then rearwardly and generally outwardly of said opening and finally substantially entirely outside said opening, carrying the obturator pivoted to said opposite end of each hinge.

10. In a door, a rotary shaft extending in the thicknesswise direction of the door; a handle protruding radially from the shaft; a substantially circular cam mounted coaxially on the shaft; a door-latch; a bell-crank operationally interposed between the periphery of the cam and the latch; a cam-follower on said crank; a notch detent therefor in the periphery of said cam; and latch operating connections between the bell-crank and the latch thereby to enable operation of said handle in a predetermined direction to unlatch the door for opening; the interengagement of said follower and detent preventing said handle from being rotated until the door is again closed and latched; a hook-detent disposed on the periphery of said cam and arcuately spaced substantially 160° from said notch-detent, said hook-detent being adapted to engage said cam-follower and lock the latch against movement in the direction opopsite to the first said direction when the door is closed and latched; thereby to prevent the door from being urged inwardly by unbalanced loads on the outer face of the door.

11. The combination with a plug-type obturator having hinges so constructed and arranged with respect to each other and the obturator being connected to a first edge of the obturator and to the adjacent jamb as to constrain the first edge of the obturator to initially move bodily laterally and inwardly out of the opening, the obturator then being constrained to move outwardly through said opening with the opposite, second, edge leading so as to clear said opening; of: means for operating said door and comprising a torque tube mutually connecting said hinges; a shaft extending in the thicknesswise direction of said obturator; an operating lever on at least the inner end of said shaft; an actuating-arm on said torque tube; shaft rotation translating means interconnecting said arm and said shaft so as to transform the rotation of said shaft about a substantially horizontal axis into rotation of said torque tube about a substantially vertical axis thereby to effect revolution of the obturator end of said hinges about the torque-tube pivots thereof so as to constrain said obturator to perform the aforesaid movements; and shaft-locking means arranged to prevent undesirable operation of said operating lever.

12. The combination with a plug-type obturator having hinges constructed and arranged with respect to each other and attached to a first edge of the obturator and to the adjacent jamb to constrain the first edge of the obturator to initially move bodily laterally and inwardly out of the opening, the obturator then being constrained to move outwardly through said opening with the opposite, second, edge leading so as to clear said opening; of: retractable bodily unitarily translationally seals at the sill and lintel regions of said obturator and concurrently bodily translating said seals to a position within the confines of the minimum vertical extent of said door-opening means for operating said door and comprising an upright torque tube mutually connecting said hinges; a shaft extending in the thicknesswise direction of said obturator; an operating lever on at least the inner end of said shaft; an actuating-arm on said torque tube; shaft rotation translating means interconnecting said arm and said shaft so as to transform the rotation of said shaft about a substantially horizontal axis into rotation of said torque tube about a substantially vertical axis thereby to effect revolution of the obturator end of said hinges about the torque-tube pivots thereof so as to constrain said obturator to perform the aforesaid movements; and means connected to each of the ends of said torque tube and to said retractable seals for retracting said seals.

13. The combination with a plug-type obturator having hinges constructed and arranged with respect to each other and attached to a first edge of the obturator and to the adjacent jamb to constrain the first edge of the obturator to initially move bodily laterally and inwardly out of the opening, the obturator then being constrained to move outwardly through said opening with the opposite, second, edge leading so as to clear said opening; of: retractable seals at the sill and lintel regions of said obturator means for operating said door and retractable seals and comprising an upright torque tube mutually connecting said hinges; a shaft extending in the thicknesswise direction of said obturator; an operating lever on at least the inner end of said shaft; an actuating-arm on said torque tube; shaft rotation translating means interconnecting said arm and said shaft so as to transform the rotation of said shaft about a substantially horizontal axis into rotation of said torque tube about a substantially vertical axis thereby to effect revolution of the obturator end of said hinges about the torque-tube pivots thereof so as to constrain said obturator to perform the aforesaid movements; obturator-detent means having a portion carried by said obturator and a complementary portion carried by the adjacent jamb of said opening; and means for operationally connecting the first-said detent portion with said shaft so as to effectuate latching and unlatching of said door.

14. The combination with an obturator for an opening in a pressurized enclosure which opening is generally smaller than the general face area of the obturator and which obturator includes latch-means adapted to latch same in closed position in said opening; of: a pair of vertically spaced hinge units, disposed along the one edge-region of said obturator, each unit comprising: a yoke type hinge member pivoted at its one end to the jamb-region of the opening in said enclosure and pivoted at its opposite end to the obturator; and obturator motion-controlling means comprising a first link pivotally associated at its one end to said opposite end of said yoke and having an opposite, pivotal end; a second link having its one end pivotally attached to said door and having its opposite end pivotally associated with the pivotal end of said first link; and means carried by the door for operating said hinge units so as to initially effect displacement of the door inwardly and laterally from a first edge of the opening, with the opposite edge of the door concurrently translating outwardly of said opening; said hinge units and motion controlling means then constraining the door to sidle bodily outwardly of said enclosure through said opening with said opposite edge leading, thereafter to enable disposition of said door in general parallelism with said enclosure with its outer face adjacent the outer face of the enclosure.

15. The combination with an obturator for plugging an opening in an air-pressurized enclosure which opening is generally smaller than the general face area of said obturator, of: a pair of "four-bar" hinge units vertically spacedly disposed in association with the one edge-region of said obturator; and means for unlocking said door and causing said hinge-units to first inwardly unplug the door, sidle it outwardly of the enclosure thru said opening and then enable its disposition in facewise attitude alongside the outer face of said enclosure; said means comprising a substantially horizontally disposed lever normally lying transversely of the obturator; means pivotally connecting the one end of said lever to the rigid structure of the obturator; a handle at the opposite end of the lever; and means carried by the handle and operable to lock and unlock said handle to control the movability of same.

16. The combination with an obturator for air-tightly plugging an opening in an air-pressurized enclosure which opening is generally smaller than the general face area of said obturator, of: an indentation extending across the lintel region of said obturator and a similar indentation at the sill region of said obturator; and an air-seal retractably mounted in each of said indentations and normally lying in protracted condition sealingly against the adjacent portion of the periphery of said opening; means primarily for opening and closing said door and including a substantially horizontally extending manual lever; oscillatable means extending longitudinally of the obturator and oscillatably connected to the one end of said lever; and means operationally connecting each of the two opposite ends of said oscillatable means to said retractable and protractable seals, said connecting means being arranged and organized with respect to said oscillatable means and to said sealing-means to effect retraction of the seals upon obturator-opening effecting movements of said lever and to effect protraction of said sealing means upon said lever's reaching its "obturator-closed" position.

17. A closure arrangement for an outward opening in an enclosure, comprising: an obturator having an overall effective height approximating that of said opening and having an overall width exceeding that of said opening; the body of said obturator including at least one transversely extending line of weakness about which the obturator may be vertically contracted and concurrently have the contracting portions directed towards the interior of the enclosure so as to decrease the effective overall height thereof; means for effecting the contraction of the obturator about at least one transversely extending line aforesaid so as to decrease the effective overall height of the door without decreasing its effective width so as to enable the initially oversized obturator to be sidled through the opening; and obturator supporting and guiding means interconnecting the obturator with the adjacent portion of the enclosure; said supporting and guiding means being constructed and arranged with reference to the correlated shape and size of said opening and to the adjacent portion of the enclosure to constrain the vertically contracted obturator to initially be displaced, at the one upright edge thereof, bodily laterally and inwardly with the opposite edge trailing and also bodily laterally displaced from its adjacent jamb, said supporting and guiding means then being effective to constrain said opposite edge to be displaced outwardly and bodily through said opening, leading the first edge; whereafter said guiding and supporting means constrains said obturator to bodily swing outside of said opening and substantially clear thereof.

18. A closure arrangement for an outward opening in an enclosure, the periphery of the opening being outwardly substantially wedge shaped, comprising: an obturator having an overall effective height approximating that of said opening and having an overall width exceeding that of said opening, said obturator having a periphery shaped with an outwardly coverging, substantially wedge shape complementary to that of said opening so as to enable said obturator to be plugged into said opening; said obturator including a pair of transversely extending lines of weakness about which said obturator may be contracted in the vertical direction and towards the interior of the enclosure; means carried by the obturator for effecting said contraction of the obturator about said lines so as to decrease the effective overall height of the door sufficiently to enable the initially oversized obturator to sidle through the opening; and obturator supporting and guiding means interconnecting the obturator with the adjacent portion of the enclosure; said supporting and guiding means being constructed and arranged with reference to the construction of the obturator, the opening, and the adjacent portion of the enclosure to constrain the vertically contracted obturator, to initially be displaced, at the one upright edge thereof, bodily laterally and inwardly with the opposite edge trailing and also bodily laterally displaced from its jamb, said supporting and guiding means being then effective to constrain the opposite edge of the obturator to be displaced outwardly and bodily thru said opening, leading the first-said edge; whereafter said guiding and supporting means constrains said obturator to bodily swing outside of said opening substantially clear thereof.

19. A closure arrangement for an outward opening in an enclosure which opening is substantially rhomboidal in elevation, comprising: an obturator having an elevational shape substantially homologous to that of said opening and adapted to plug fit from inwardly of said enclosure outwardly into said homologous opening; vertically-spaced obturator supporting and guiding means interconnecting the one edge of the obturator and the adjacent portion of the enclosure, said means being pivotally interconnected and said means being so constructed and arranged with reference to said obturator, to the opening, and to said enclosure as to initially unplug inwardly and first be displaced bodily laterally and inwardly of the enclosure at a first edge and concurrently to be displaced laterally at the opposite edge of the obturator with the first edge leading, the obturator being thereafter constrained by said supporting and guiding means to undergo bodily edgewise displacement outwardly through said opening with said opposite edge leading so as to terminally bring the obturator to rest outwardly of said opening and clear thereof; mutually coacting means respectively fixed to the enclosure and to the pivotal-interconnecting means and set in train by said initial movement of said obturator to first lower same with respect to the top and bottom edges of said enclosure-opening contemporaneously with said unplugging sequentially followed by said coacting means raising the obturator with respect to the lower edge of said opening in the edgewise-displacement phase of moving said obturator thru said opening; thereby to enable said rhomboidal obturator to be inwardly opened and outwardly swung while remaining at its original overall height and width.

20. A closure arrangement for an outward opening in an air-pressurized aircraft cabin having an outwardly covex wall, said opening being substantially rhomboidal in elevation, comprising: a closure having top and bottom edge-portions joining spaced side-edge portions, said closure having an overall effective area greater than that of said opening and being curved congruently with the curve of said wall to adapt it to be plugged outwardly into the opening from the inside of the cabin; each of the four corners of said closure lying at a different vertical location from the vertical locations of the remaining corners; each of the true-geometric corners of said closure, formed by the intersection of the prolongation into the plane of said convex wall from each two adjacent sides of said closure, lying at a different lateral distance from the longitudinal center-line of said closure, and no two physical corners of the closure being able to pass through said opening simultaneously; the slanting top edge of the closure extending higher above the one upright edge thereof than the slanting bottom edge of the closure extends below said upright edge; closure-supporting and guiding means interconnecting said upright edge with the adjacent portion of the enclosure, said means being pivotally interconnected and together lying below the horizontal center-line of the closure; said means being so constructed and arranged with reference to said closure, to said opening and to said enclosure as to be adapted to initially unplug, inwardly and laterally, at a first upright edge of said closure while concurrently laterally displacing the opposite edge and directing it outwardly with the first edge leading the unplugging movement, said supporting means being adapted to thereafter constrain said closure to bodily sidle outwardly through said opening with said opposite edge leading; supporting means being adapted to constrain said closure to thereafter swing bodily outwardly of said opening and substantially clear thereof; a cylindric inclined-face cam-member fixed coaxially to said means that connect said closure-supporting means and a complementary cylindric cam member fixed to said enclosure coaxially sub-adjacent to the first-said cam member with its "low" side sub-adjacent the "high" side of the first-said cam member; the initial unplugging movement of said closure thereby effecting camming downwardly of the closure with respect to said slanting top edge of said opening in phase with said unplugging; the second, outwardly-sidling phase of the opening of the closure effecting such operation of said two camming members as to effect raising of the closure with respect to the lower edge of said opening, thereafter to enable bodily outward swinging of the closure substantially clear out of said opening.

21. In a closure arrangement of the type described and including an enclosure having an outward opening adapted to be outwardly plugged by an inward obturator: means for effecting controlled latching and unlatching of said obturator and comprising a latch-member having a first end protruding laterally from one upright edge of said obturator; means pivotally mounting the opposite end thereof to the obturator; means mounted to the adjacent jamb of said opening for receiving and "keeping" said first end; manually operable means connected to said picvtal opposite end for pivoting said first end out of said keeper means so as to unlatch said obturator; rotatable means mounted upright in said keeper and engageable by said first end for enabling said pivoted latch member to revolve outwardly when the obturator is unplugged inwardly of the enclosure; and further rotatable means mounted upright in said keeper and engageable subsequently by said first end to enable said latch member to revolve inwardly upon initial outward displacement of said obturator, whereby to maintain said door against extra-means unbalanced forces applied to the exterior thereof.

22. In an obturator arrangement for an outward opening in an enclosure of the type which is supported and guided by a vertically spaced pair of C-hinges, each of which has the one end pivotally connected to the enclosure structure and has the opposite end pivotally connected to an adjacent upright edge of the obturator: means automatically effective for latching the obturator against the adjacent outer face of the enclosure and comprising a pin mounted upright on the outer face of said enclosure; a detent group pivotally mounted on the door, said group consisting of a spring-loaded toggle linkage, the link thereof that is proximal the door being pivoted to the door at the proximal end and free at the distal end, the link thereof that is distal from the door pivotally carrying a detent proper at the distal end of the link and mounted for horizontal swinging movement the spring loading said toggle linkage abutting the distal end of the first-said link so as to enable engagement of the detent-proper with said pin when the door abuts the outside of the fuselage; whereby when the door is opened and abutted by its outer face against the outer face of said enclosure, said detent proper is automatically engaged horizontally around said pin so as to hold said door open.

23. In an obturator arrangement for an outward opening in an enclosure of the type which is supported and guided by a vertically spaced pair of C-hinges, each of which has the one end pivotally connected to the enclosure structure and has the opposite end pivotally connected to an adjacent upright edge of the obturator: means automatically effective for latching the obturator against the adjacent outer face of the enclosure and comprising a pin mounted upright on the outer face of said enclosure; a detent group pivotally mounted on the door, said group consisting of a spring-loaded toggle linkage, the link thereof that is proximal the door being pivoted to the door at the proximal end and free at the distal end, the link thereof that is distal from the door pivotally carrying a detent proper at the distal end of the link and mounted for horizontal swinging movement the spring loading said toggle linkage abutting the distal end of the first-said link so as to enable engagement of the detent-proper with said pin when the door abuts the outside of the fuselage; whereby when the door is opened and abutted by its outer face against the outer face of said enclosure, said detent proper is automatically engaged horizontally around said pin so as to hold said door open; and means for manually unlatching the latched obturator, and comprising means pivotally connecting the distal end of the proximal link to that end of the C-hinge which is pivoted to the obturator; a hand grip on the opposite end of said proximal link and said opposite end being free; whereby a manual pull on said hand grip to displace the proximal end of the proximal link away from said supporting hinge effects release of said detent from said pin.

24. In a door-arrangement of the type described and including an enclosure having an outward opening therein, the opening having a pair of spaced jambs and the door having an upright edge: a "door-closed" latch group of the bayonet type and comprising an elongate member pivotally mounted to an upright edge region of the door and having one end extending into juxtaposition with the adjacent jamb; socket-means fixedly carried by said jamb in adjacency to the end portion of said elongate member and adapted to receive and release said end, said socket-means including a pair of spaced, upright rollers against which said end successively rollably bears as the door unplugs inwardly and sidles outwardly of said opening, respectively.

25. In combination with the structure of a pressurized aircraft cabin which has a doorway to the exterior defined by a sill, lintel, and two spaced jambs, a door of a width exceeding the spacing between the jambs, and of a height less than the height of the doorway, tab means hingedly mounted along at least one of the horizontal edges of the door, for swinging with respect to the door inwardly of the cabin to decrease the overall combined height of the door and tab means, or outwardly to increase such combined height to at least equal the height of the doorway, an actuator carried by the door and movable between "open" and "closed" positions, an operative connection between said actuator and said tab means for swinging the tab means inwardly during initial movement of the actuator from "closed" position, and means hingedly supporting said door from one jamb, and guiding the same for swinging through the doorway outwardly into an open position following such inward swinging of the tab means.

References Cited in the file of this patent
UNITED STATES PATENTS

| | | |
|---|---|---|
| 2,284,409 | Erath | May 26, 1942 |
| 2,530,160 | Finley | Nov. 14, 1950 |
| 2,584,404 | Webb | Feb. 5, 1952 |
| 2,763,900 | McAfee et al. | Sept. 25, 1956 |